(12) United States Patent
Birnbach et al.

(10) Patent No.: US 12,104,223 B2
(45) Date of Patent: Oct. 1, 2024

(54) ADVANCED BENEFICIATION PROCESS FOR BENEFICIATION, MOBILIZATION, EXTRACTION, SEPARATION, AND CONCENTRATION OF MINERALOGICAL RESOURCES

(71) Applicant: Advanced Fusion Systems LLC, Newtown, CT (US)

(72) Inventors: Curtis Birnbach, New Rochelle, NY (US); William Joyce, Newtown, CT (US)

(73) Assignee: Advanced Fusion Systems LLC, Newtown, CT (US)

( * ) Notice: Subject to any disclaimer, the term of this patent is extended or adjusted under 35 U.S.C. 154(b) by 0 days.

(21) Appl. No.: 17/508,498

(22) Filed: Oct. 22, 2021

(65) Prior Publication Data
US 2023/0129947 A1    Apr. 27, 2023

(51) Int. Cl.
| | |
|---|---|
| *C22B 5/00* | (2006.01) |
| *C22B 4/08* | (2006.01) |
| *C22B 5/14* | (2006.01) |
| *C22B 59/00* | (2006.01) |

(52) U.S. Cl.
CPC .............. *C22B 5/14* (2013.01); *C22B 4/08* (2013.01); *C22B 59/00* (2013.01)

(58) Field of Classification Search
CPC .............. C22B 5/14; C22B 4/08; C22B 59/99
See application file for complete search history.

(56) References Cited

U.S. PATENT DOCUMENTS

| | | | | |
|---|---|---|---|---|
| 3,856,918 A | * | 12/1974 | Skrivan | B01J 15/00 423/DIG. 10 |
| 5,688,477 A | | 11/1997 | Nel | |
| 2008/0286181 A1 | * | 11/2008 | Freitas | C22B 34/1209 423/80 |
| 2012/0109604 A1 | * | 5/2012 | Chen | G01V 11/00 703/2 |
| 2012/0152722 A1 | * | 6/2012 | Birnbach | H01J 35/045 422/310 |
| 2016/0045841 A1 | * | 2/2016 | Kaplan | C01B 32/05 429/49 |

(Continued)

FOREIGN PATENT DOCUMENTS

| | | | |
|---|---|---|---|
| AU | 2002220358 B2 | 11/2007 | |
| CN | 85202680 | * 6/1986 | ............. C21B 13/12 |

OTHER PUBLICATIONS

International Search Report and Written Opinion in PCT Application No. PCT/US22/46755, mailed Feb. 15, 2023.

(Continued)

*Primary Examiner* — Zulmariam Mendez
(74) *Attorney, Agent, or Firm* — Leason Ellis LLP

(57) ABSTRACT

A method for beneficiation of mineralogical materials that comprises using a one or more of a suite of processes including fluidized bed separation, plasma-based stimulation or enhancement of chemical reactions using a Reactive X-Ray Chemical Processor, field enhancement of chemical reactions and process and drying. All of the processes can be used singly, jointly, simultaneously or sequentially in multiple stages. The methods are nearly non-polluting and serve to replace polluting wet chemistry and other beneficiation techniques.

25 Claims, 15 Drawing Sheets

(56) References Cited

U.S. PATENT DOCUMENTS

2019/0389736 A1* 12/2019 Tavakkoli ............... C09C 1/021
2021/0388463 A1* 12/2021 Jokiniemi ............... C22B 7/001

OTHER PUBLICATIONS

Anonymous: "III. Plasma Physics with X-rays", Sep. 30, 2021 (Sep. 30, 2021), XP093021850, Retrieved from the Internet: URL:https://photon-science.desy.de/news_events/research_course/iii_plasma_physics_with_x_rays/index_eng.html [retrieved on Feb. 7, 2023].

* cited by examiner

ADVANCED BENEFICIATION PROCESS FOR BENEFICIATION, MOBILIZATION, EXTRACTION, SEPARATION, AND CONCENTRATION OF MINERALOGICAL RESOURCES

CROSS-REFERENCE TO RELATED APPLICATIONS

The present disclosure relates to commonly-owned U.S. patent application Ser. Nos. 17/508,427 and 17/508,469 (Now U.S. Pat. No. 11,471,848) filed concurrently herewith, both of which are incorporated by reference in their respective entireties.

FIELD OF THE INVENTION

The present disclosure relates to chemical engineering, and in particular relates to a method and system for nearly pollution-free beneficiation of mineralogical resources.

Definitions

Acid Mine Waste: Sometimes also referred to as Acid Mine Water, abbreviated as AMW in both cases. This is ground water that has been contaminated either by run off from a mine or by acidic beneficiation processes in mining operations. This liquid is highly contaminated by a wide variety of chemicals and represents a significant source of pollution.

Actinides: Chemical elements occupying atomic number positions 89 through 103 on the periodic table that are naturally radioactive to varying extents. For the purposes of this document, Radium, atomic number 88, and Promethium, while technically a Lanthanide, which is also a naturally radioactive element, atomic number 61, are included with the Actinides. It is noted that in many cases, these elements are found together in varying ratios, thus complicating subsequent separation processes.

Beneficiation: A process or group of processes that enhance the properties of mineralogical or metallurgical resources to a product suitable for commercial and industrial purposes.

Concentration: A chemical or mechanical process that increases the percentage of an element or compound in a medium by removing the presence of other, undesirable elements or compounds in the medium.

Drier: In the context of this document, the term of art, "Drier" refers to a means of applying thermal energy into a chemical process to remove water or other undesired liquid content from said chemicals. It is noted that the physical components of the drier can also have other functions in a given system so long as appropriate considerations for proper operation are observed.

Dry Chemistry: The term "dry chemistry" as used herein refers to those processes that occur plasmas rather than solutions. They produce fewer pollutants and the remediation is far simpler. It can also be used to refer to other mineralogical beneficiation processes such as crushing, grinding, screening and sorting, which also do not run in liquid baths or produce substantial quantities of pollutants from their operation.

Electromagnetic field: for ease of description, when the term "electromagnetic field" is used alone herein, it means either an electric field alone (E), a magnetic field alone (H), an electrostatic field, or a combination of the above.

Extraction: A chemical process or group of processes that are designed to isolate a specific element or compound from a surrounding matrix.

Feedstock: A starting material input to a system which is to be intended to be modified (e.g., separated, chemically altered, decomposed, sterilized) by processes performed by the system. The feedstock can comprise granular solids, liquids, gases or plasma.

Field Enhancement: In the context of this document, the term of art, "Field Enhancement", and its derivatives refer where the presence of such fields enhances some aspect of the reactions carried on within a given apparatus which occur in the presence of intentionally applied electric and magnetic fields.

Flash X-ray Irradiator: A cylindrical large area X-ray source capable of extremely high radiation levels for the purposes of decomposing, sterilizing, or reacting materials within its interior reaction zone. The Flash X-ray Irradiator is the predecessor technology to the RXCP and is described in U.S. Pat. No. 8,019,047 "Flash X-ray Irradiator" (hereinafter '047 patent or FXI). The '047 patent is hereby incorporated by reference in its entirety for any purpose.

Flocculation: A chemical process in which a chemical coagulant is added to a bath and acts to facilitate bonding between particles, creating larger aggregates which are easier to separate. The particles come out of suspension in the form of floc or flake (synonymous terms of art). The action differs from precipitation in that, prior to flocculation, particles are merely suspended, in the form of a stable dispersion in a liquid and are not truly dissolved in solution.

Flotation: A chemical process in which a solution containing one or more desired chemical compounds or elements is mixed with a chemical bath of a specific pH and composition in order to cause the desired chemical compounds or elements rise to the surface where they can be removed by a skimmer or similar apparatus. After flotation, the desired compounds or elements are washed and dried, or sometimes subject to additional wet processes to extract the desired compound or element.

Fluidized Bed: A physical phenomenon that occurs when a fluid (liquid, gas, or plasma) entrains a quantity of a granular solid particulate medium (usually present in a holding vessel) under appropriate conditions to generate a granular solid/fluid mixture that behaves as a fluid, referred to as fluidization of the particulate medium. This is usually achieved by the introduction of pressurized fluid, gas, or plasma, through the particulate medium. This resulting sold/fluid mixture has many properties and characteristics of normal fluids, such as the ability to free-flow under gravity, or to be pumped using fluid type technologies. Fluidized beds are used to facilitate chemical reactions and can as in the above mentioned invention also be used to separate materials based on density and particle size.

Fluidized Bed Concentrator: A mechanical apparatus that utilizes aspects of fluidized bed technology to achieve physical separation of a feedstock on the basis of particle size and density. —Also referred to as FB Concentrator or FB Separator Fluidizing Medium: A granular solid, liquid, gas or plasma which is injected into a Fluidized bed to effect fluidization of the bed medium.

Fluorapatite: The ore from which some fertilizers, phosphoric acid, hydrofluoric acid and phosphogypsum are produced. Its chemical formula is $Ca_5F(PO_4)_3$. It is usually found in combination with Hydroxyapatite $[Ca_5(PO_4)3OH]$.

Lanthanides: Chemical elements known as the Rare Earths and which occupy atomic number positions 57 to 71 on the periodic table, and Scandium, atomic number 21, and Yttrium, atomic number 39.

Leaching: A chemical process in which a feedstock is mixed with another chemical, typically, but not always a strong acid, base, bacteria, or salt, in order to mobilize a desired chemical. The desired chemical enters solution and is available for subsequent processing steps.

Ligand: A ligand is an ion or molecule that binds to a central atom to form a coordination complex. Ligands in a complex dictate the reactivity of the central atom, including ligand substitution rates, the reactivity of the ligands themselves, and redox. Ligand selection is a critical consideration in most reactions that involve them.

Mobilization: A chemical process which frees a desired element or compound from a complex in a mineralogical resource to enable further beneficiation.

Modulate: to adjust settings of analog equipment, such as analog valves, in a continuous manner (i.e., from fully closed, to partially closed/open to fully open).

Phosphogypsum: A byproduct from the refining of Fluorapatite in the production of fertilizer, phosphoric acid, and Hydrofluoric Acid. Chemically, it is a hydrate of Calcium Sulfate ($CaSO_4 \cdot 2H_2O$). This material also contains recoverable amounts of Rare Earths (Lanthanides) and some radioactive elements (Actinides).

Phosphoric Acid: The chemical $H_3PO_4$ is used in the production of some fertilizers and also used in many chemical reactions and in the production of some food products, cosmetics and toothpaste.

Plasma: Plasma is the fourth state of matter (other than solid, liquid, gas). It is characterized by having one or more of its electrons removed and it exhibits properties of both liquids and gases. Plasmas are created by a number of means including but not limited to DC excitation, RF (and microwave) excitation, and excitation by means of X-rays, gamma rays and high energy secondary electrons. The current invention is primarily concerned with the use of x-rays as the means of ionization. X-rays are particularly useful as they are at very high energies and thus a single photon can be used multiple times in a given reaction including the generation of high energy secondary electrons, which, by themselves, are useful in stimulating reactions if of high enough energy. It is also the simplest means of achieving total ionization, which is a necessary condition for many of the reactions contemplated by the current invention.

Precipitation: A chemical process in which a solution containing one or more desired compounds or elements is mixed with a chemical bath of a specific pH and composition in a container in order to cause the desired chemical compounds or elements fall to the bottom of the container from which they can be removed by any of several well-known means.

Rare Earths: The group of elements (atomic numbers 57 to 71) including the Lanthanides, Scandium, atomic number 21, and Yttrium, atomic number 39.

Reactive X-ray Chemical Processor: A type of chemical processor designed to enhance reaction conditions by the use of X-ray radiation to ionize species present and promote reactions in a plasma environment. This processor is disclosed in U.S. Pat. No. 9,406,478 entitled "Method and Apparatus for Inducing Chemical Reactions by X-ray Irradiation" (hereinafter '478 Patent, and/or RXCP). The '478 patent is hereby incorporated by reference in its entirety for any purpose. See also: Universal Chemical Processor (UCP)

Screening: The practice of mechanically separating granulated material into multiple grades by particle size using a screen. The screen is a surface with a dense uniform pattern of holes that allows particles smaller than the size of the holes to pass through. Screening can be accomplished using gravitational, vibrational, density, or electrostatic techniques.

Separation: A chemical or mechanical process or group of processes that are designed to isolate chemically similar compounds.

Settling (Sedimentation): A process similar to precipitation in which the desired compounds or elements fall out of a mixture in a container over time (typically due to gravity) but without use of additional chemicals. The desired compounds or elements and then can be collected from the container by well-known means.

Sieving: A subset of screening that is a laboratory procedure in which precision screens are used to sort material based on particle size. The American Society for the Testing of Materials (ASTM) defines screen sizes. These are usually expressed as "mesh" i.e. 200 mesh, 50 mesh, etc.

Stack: Phosphogypsum is normally stored outdoors in a very large pile called a "Stack". Stacks are frequently dozens of acres in sizes and can be hundreds of feet high.

Tailings: Material left over from beneficiation processes of mining operations.

Thickening: As the name implies, thickening is the process where the viscosity of a solution, liquid, slurry, etc. is increased. Some chemical processes work well with low viscosities while others require high viscosities. Thickening provides reliable methods of controlling the viscosity of materials during various stages of processing.

Universal Chemical Processor: The Universal Chemical Processor (UCP), the subject of commonly-owned U.S. patent application Ser. No. 17/508,427, now abandoned, is an advanced and technologically enhanced form of the Reactive Chemical Processor (RXCP), subject of the commonly-owned '478 patent. The UCP is a reactor that includes an RXCP, supports a fluidized bed, and can also include enhancement by producing electromagnetic fields. Any place in this document that the RXCP is mentioned, it is possible to substitute the UCP in its place if desired. Similarly, the UCP also incorporates the functionality of the Fluidized Bed (FB), commonly-owned U.S. patent application Ser. No. 17/508,469, also with technological enhancements. A comprehensive description of the UCP is provided in this document.

Wet Chemistry: The term "wet chemistry" as used herein refers to those chemical processes that are conducted in a liquid medium and state. As used in the processing of mineralogical ores, tailings, waste products and byproducts, it generally refers to processes that utilize quantities of strong acids, strong bases, amines and biologicals. Wet processes are typically heavily pollution and there remediation is expensive.

BACKGROUND

Mining has provided numerous benefits to mankind since the dawn of time. The oldest-known mine in the archaeological record is the Ngwenya Mine in Swaziland, which radiocarbon dating has shown to be about 43,000 years old. Paleolithic humans mined hematite there which was processed to make the red pigment ochre. The Bronze Age, the Iron Age, the development of steel, the extraction of precious metals (gold, silver, etc.) all required chemical processing to be useful and all made major contributions to the development of our modern technological society. More recently, with the advent of modern computer and communication technology, reliable supply of a wider range of minerals, including Rare Earths, have become a pressing need. Unfortunately, mining is also one of the biggest sources of environmental contamination. Conventionally, mining uses a number of processes, referred to as "wet" processes to chemically and mechanically separate the desired minerals and elements from others present in ores. These processes are collectively referred to as "beneficiation", signifying the "gaining" of the benefit of the desired mineral in the ore. Conventional beneficiation processes involved include, but are not limited to, leaching, stripping, precipitation, settling, flotation, sedimentation, flocculation, concentrating, mobilization, screening, and thickening. Most often, these processes are based on large scale liquid chemistry operations (e.g., in large liquid baths, tanks or ponds) that use toxic and highly polluting chemicals such as strong acids (sulfuric, nitric, hydrochloric, hydrofluoric, etc.), strong alkalines (Caustic Soda (NaOH), Quicklime (CaO), Ammonia ($NH_3$), Soda Ash ($Na_2CO_3$), Limestone ($CaCO_3$), to name a few), concentrated salts (potassium chloride, etc.), various amines and others. While these chemicals can be efficient in producing the desired chemical reactions, during the beneficiation processes the liquids become highly contaminated and are extremely difficult and expensive to dispose of in an environmentally sound fashion.

In the processing of Rare Earth mineralogical source materials, one must be aware that in almost all cases, the source ore is found in deposits that also contain, variously, Uranium, Radium, and Thorium, and daughter isotopes, as well as other undesirable chemicals. This is an unfortunate property of these materials and is another of the reasons why the United States has moved away from primary processing of these Critical Materials, the other being the large amounts of toxic byproducts from the known processing regimes produced.

Due to the environmental problems pertaining to wet chemical processes and Rare Earth beneficiation, there is very little Rare Earth processing in the United States. Despite the critical importance of the Rare Earth minerals to high technology manufacturing, the United States largely relinquished its globally dominant position in the mining and Rare Earth processing in the 1980's as it proved too difficult and expensive to beneficiate materials containing Rare Earths while maintaining compliance with the governing environmental regulations. China, which has large deposits of Rare Earth minerals, and fewer restrictive environmental regulations, thereafter became the largest processor of Rare Earths. Globally, many companies with significant Rare Earth resources send mined ore China and one or two other countries for processing in order to avoid processing the materials locally and dealing with the toxic byproducts of that activity.

It is only in recent years that an awareness of the need for the United States to return to its position of self-sufficiency in this market has emerged. But the state of the art for Rare Earth beneficiation remains the wet chemical processes that are still encumbered with the same set of environmental problems. There is therefore a substantial need for improved beneficiation technology, particularly for but not limited to Rare Earth minerals.

SUMMARY OF THE DISCLOSURE

According to one aspect, the present disclosure provides a method for beneficiation of mineralogical materials that comprises performing at least one separation on the mineralogical materials using a fluidized bed process and performing at least one chemical reaction on the mineralogical materials using a plasma-based process.

In some implementations, the mineralogical materials contain at least one of a Lanthanide and an Actinide. More specifically, the mineralogical materials can include at least one of: i) a Lanthanide ore, ii) tailings containing at least one of a Lanthanide and an Actinide, iii) a byproduct of a mining operation containing at least one of a Lanthanide and an Actinide, and iv) waste stream of a mining process containing at least one of a Lanthanide and an Actinide.

According to the method the mineralogical materials are input as feedstock into a fluidized bed concentrator in which the fluidized bed process occurs. The fluidized bed concentrator separates components of the mineralogical materials according to density.

In some embodiments, the plasma-based process is performed using a Reactive X-ray Chemical Processor (RXCP). For some processes, both the fluidized bed process and plasma-based process are performed within a Universal Chemical Processor apparatus (UCP).

The present disclosure also provides a method for beneficiation of mineralogical materials comprising inputting the mineralogical materials into a reactor vessel and performing at least one chemical reaction on the mineralogical materials using a plasma-based process in which the plasma is generated by x-radiation.

Numerous additional inventive aspects of the present disclosure are described in the detailed description below.

DETAILED DESCRIPTION

Figure 1:
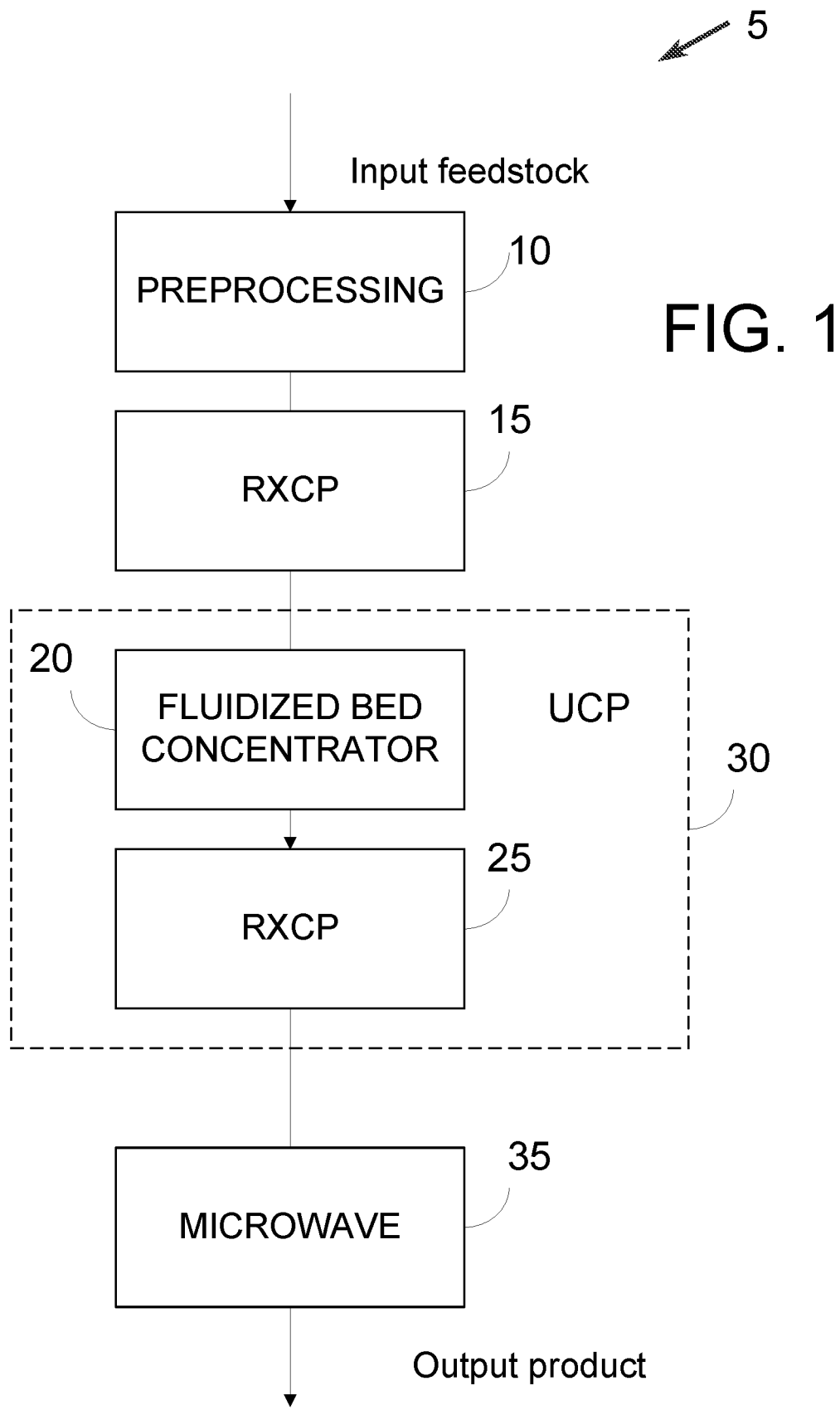
FIG. 1 is a schematic block diagram of an exemplary system for non-contaminating mineralogical beneficiation according to an embodiment of the present disclosure.

The current practice of the mining industry performs beneficiation using "wet" processes such as Leaching, Flotation, Precipitation, Flocculation, and Settling. These processes typically require large quantities of strong acids (typically sulfuric ($H_2SO_4$), nitric ($HNO_3$), hydrochloric (HCl), hydrofluoric (HF), etc.), strong alkalines (Caustic Soda (NaOH), Quicklime (CaO), Ammonia ($NH_3$), Soda Ash ($Na_2CO_3$), Limestone ($CaCO_3$), to name a few), bacteria, or other salt solutions. At the conclusion of these processes, there is a large quantity of these chemicals left over that is contaminated by a wide array of toxic chemicals which represent a significant pollution threat. It is costly to remediate this waste material, adding to the overall cost of the resulting products. Additionally, beneficiation operations often produce large quantities of contaminated process water which cannot be released without a significant amount of treatment. In sum, the separation and related processes performed by the mining industry are responsible for the generation of a substantial portion of the toxic waste produced by the mining industries, and replacement with a pollution-free alternative would resolve a long-standing problem.

The present disclosure provides methods and systems for non-contaminating and non-polluting beneficiation of mineralogical resources. In various embodiments, one or more fluidized bed concentrators and Reactive X-Ray Chemical Processors (RXCPs), and other non-contaminating devices and processes are combined in a system in which feedstock materials can be separated, concentrated, and subject to chemical reactions and heat transfers; the ultimate products of these processes in the system are non-contaminating. In some embodiments, a fluidized bed concentrator and an RXCP is combined in single apparatus referred to as a Universal Chemical Processor (UCP) described in the concurrently filed U.S. patent application Ser. No. 17/508,469.

As noted, there is a long felt need to replace existing wet chemistry-based metallurgical beneficiation processes, with a more advanced set of processes which are more environmentally friendly. In order to replace the existing wet chemistry processes, it is necessary to implement replacement technologies which achieve the same or similar end results yet, not create any long-lasting pollutants. In recognition of the large number of processes involved in beneficiation of metallurgical materials, it is necessary to have a chemical reaction means which can be readily adapted to a wide range of processes and can be easily adapted to new processes as they evolve.

Plasma processing has been demonstrated to be a highly viable means for replacing wet chemistry processes. The RXCP, having the ability to generate a controllable plasma in a confined reaction zone, offers a means for addressing numerous existing reaction processes. There are several advantages of the plasma and/or field based approach, one of which is that these approaches typically produce little liquid or solid contaminant byproducts. Whatever gaseous byproducts are produced can be remediated using gas scrubbers, HEPA filters, and pyrolysis units to avoid any environmental contamination. As an additional safety measure, residual gas mass spectrometers can be employed to analyze the effluent of the gas scrubbers and pyrolysis units to ensure that no pollutants are released into the atmosphere. Thus, the application of plasma-based chemical processes to mining beneficiation addresses a long felt need for better and safer chemical reaction processes in this field.

As will be discussed further below, fluidized bed technology provides another method of providing non-polluting separation processes. A simplified version of a conventional fluidized bed, hereinafter referred to as a "concentrator", can be used. This simplified approach is important, as many applications require more than one fluidized bed stage, and by simplifying the fluidized bed design, lower cost installations are possible. The inherent nature of the fluidized bed used in this application is that it has no means of generating pollutants, which is a vast difference from the existing wet chemistry approaches to separation.

The combination of the plasma-based, fluidized bed, and other technological approaches in various configurations and permutations allows virtually any existing metallurgical beneficiation process to be replaced by a non-polluting alternative. Metallurgical beneficiation is typically conducted as a series of operations that can be generally classed as either reactive processes, drying, or separation processes. There are frequently many stages involved, leading to complex factory configurations. The present disclosure describes the "building blocks" to achieve comparable processing lineups. The individual elements, i.e. the Reactive X-ray Chemical Processor (RXCP) including the Flash X-Ray Irradiator ('FXI'), the Universal Chemical Processor (UCP), and/or the fluidized bed (FB), as well as components for electromagnetic field enhancement and drying, can be repeated as many times as is necessary, and in as many combinations as necessary, with each specific iteration being adjusted to mirror a specific wet chemical process or adjusted to perform a novel "dry" process. This "building block" approach is desirable as it allows for efficiencies in manufacture of both of these devices by moving them into a mass production environment.

FIG. 1 is a schematic block diagram illustrating an exemplary system for non-polluting beneficiation of mineralogical materials according to the present disclosure. The exemplary system 10 includes a number of distinct apparatus that together with other known non-contaminating processes such as crushing, grinding, screening, and sieving combine to process a mineralogical feedstock input into desired outputs and in particular, can be used to isolate radioactive minerals (Actinides) from a matrix without using wet chemical-type leaching processes. In a first stage of the system 10, low-grade mineralogical feedstock is input to "preprocessing" apparatus of combination of devices. The mineralogical feedstock is, in this case, low-grade ores or similar materials that include uranium, radium, or other undesirable compounds. The preprocessing stage denotes the use of existing devices to prepare materials for processing using the plasma-based and fluidized bed devices according to the present disclosure, and as appropriate to the specific process being implemented. Depending upon the implementation, the preprocessing apparatus can include, among others, screeners and filtration devices of various types. A screener separates granulated material into multiple grades by particle size using a screen. The screen is a surface with a dense uniform pattern of holes that allows particles smaller than the size of the holes to pass through. The screener can employ gravitational, vibrational, density, or electrostatic techniques. Other devices can be employed in preprocessing stages, as well as post-processing stages, to perform procedures including, but not limited to, crushing, grinding, screening (per above), and drying (including but not limited to microwave and conventional). These are all non-polluting processes and are considered acceptable and necessary to be included in this new paradigm for beneficiation. More generally, it will be apparent to the person of ordinary skill in the art that mechanical processes such as grinding, sorting, sieving, etc. can be used in combination with the techniques described herein to achieve a comprehensive mineralogical beneficiation scheme. These processes can be combined in different ways (as preprocessing, post-processing or intermediate processes) with the plasma-based, radiation-based, field enhanced-based, and fluidized bed processes as required to implement a specific processing regime.

In system of FIG. 1, after mineralogical feedstock is preprocessed, it is input to an RXCP apparatus 15. As discussed further below, the RXCP apparatus can be incorporated in a Universal Chemical Processor (UCP) that also supports a fluidized bed and other operational modes. (Note: Any place RXCP is mentioned, UCP can be substituted if desired). As noted in the definitions, the RXCP is disclosed in detail in commonly-owned U.S. Pat. No. 9,406,478 which has been incorporated by reference but will be described in greater detail below in any case. The RXCP employs a hollow cylindrical X-ray source to ionize material that is input into the RXCP. In the ionized state the materials are subject to chemical reactions that can be controlled via the operating parameters of the RXCP. The use of the RXCP 15 at this stage can be considered to replace a conventional leaching process using sulfuric acid ($H_2SO_4$) as reactants including hydrogen sulfide gas ($H_2S$) and oxygen ($O_2$) are input to the RXCP. In addition, substitution of reaction of the feedstock in the RXCP for the conventional sulfuric acid leaching step, provides an increase in throughput while eliminating the waste associated with the wet leaching.

Still referring to FIG. 1, following the reaction in the first RXCP 15, products are then separated out using a fluidized bed concentrator 20, or other separation means. The fluidized bed concentrator separates the materials input into it by density by virtue of the properties of the fluidized bed maintained in the concentrator. The fluidized bed substitutes for a conventional wet chemical precipitation stage. In this stage as well, throughput increases and toxic waste is eliminated. One of the output streams of the separation that exits from the fluidized bed concentrator 20 (e.g., having the denser components) is input to a second RXCP 25 running a different process which causes precipitation of the uranium components. In the RXCP 25, oxygen is added to water to produce hydrogen peroxide in plasma form (in contrast to the conventional wet chemical process in which it is in liquid form). It is noted that in some embodiments the separation and precipitations steps can be performed by a UCP 30 that combines the features of the fluidized bed and RXCP. After precipitation, the product is dried, for example using a microwave oven device 35. It is noted that the above description is adapted for processing in the continuous mode, that is with a continuous supply of mineralogical material being fed in, and consequently, continuous processing of that material. In a batch mode which involves a collected, finite supply of feedstock, the system can be simplified in that any consecutive sequences of fluidized bed and RXCP components can be combined in a single UCP, which can be switched to perform different operations over time in a processing sequence, or can be done in a series of individual device process steps.

Figure 2:
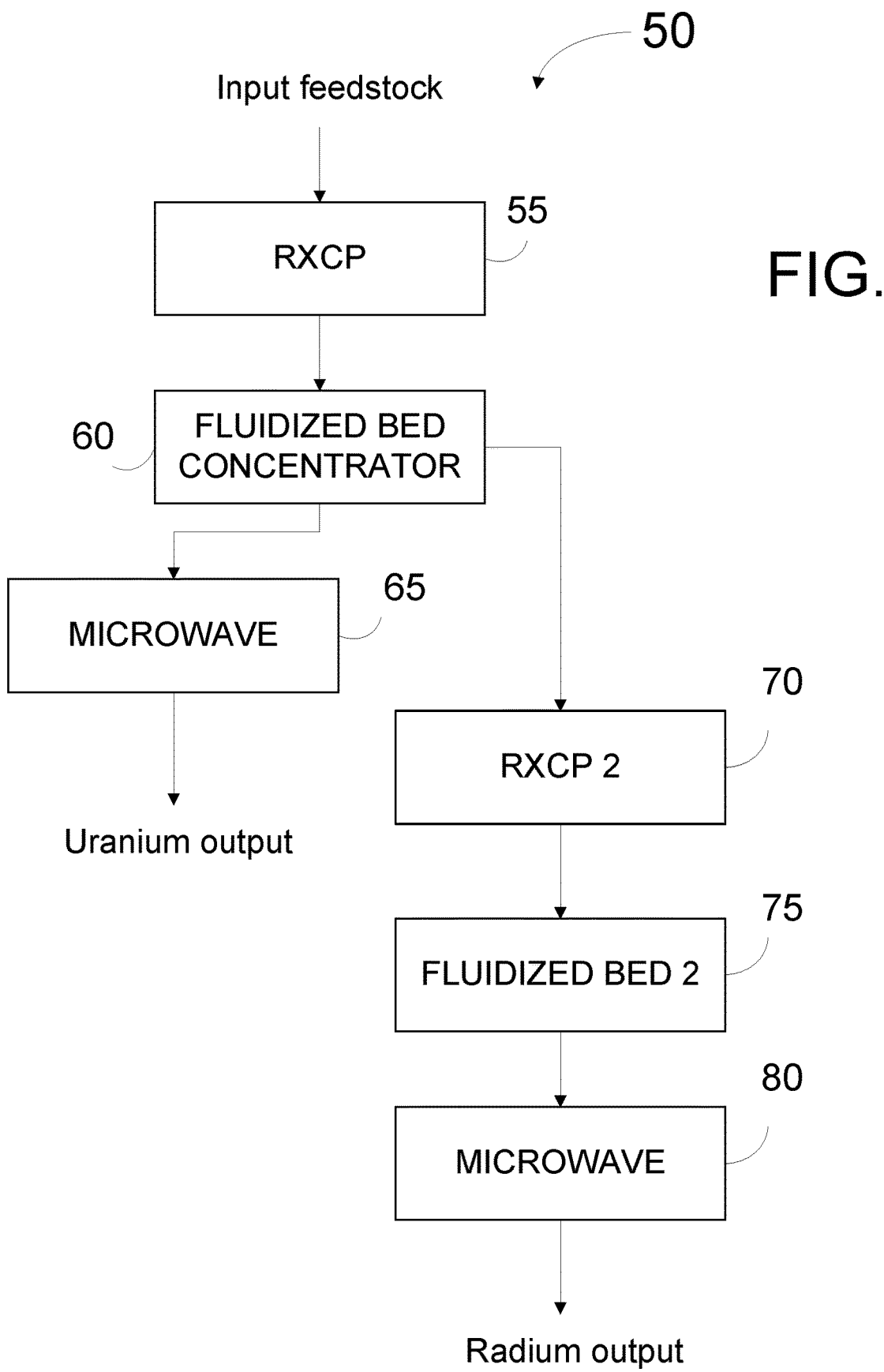
FIG. 2 is a schematic block diagram of another exemplary system for non-contaminating mineralogical beneficiation according to an embodiment of the present disclosure adapted for removal of uranium and radium from phosphogypsum.

FIG. 2 is a schematic block diagram illustrating another exemplary system for non-contaminating beneficiation of mineralogical materials according to the present disclosure adapted for removal of uranium and radium from phosphogypsum. Phosphogypsum ($CaSO_4 \cdot 2 H_2O$) is a byproduct of phosphate-based fertilizer manufacture that has useful components but because it contains small amounts of Uranium and Radium it is currently precluded from being so utilized. In the system shown in FIG. 2, phosphogypsum material, which may be taken from a phosphogypsum stack prevalent at fertilizer manufacturing sites, or directly from the fertilizer/hydrofluoric manufacturing processes, is input as feedstock to a first RXCP 55. In the RXCP 55, the material is subject to chemical reactions typically in the presence of hydrogen sulfide ($H_2S$) and oxygen ($O_2$). This step replaces wet leaching using sulfuric acid, as these two gases react in the plasma to form an ionic state of sulfuric acid. The products of the reaction in the RXCP 55 are fed into a fluidized bed concentrator 60 in which the product materials are separated according to density and particle size. This step replaces conventional wet chemical precipitation or other wet separation processes. It is noted that there are other processes that will provide a similar result to the use of hydrogen sulphide but using different compounds.

Referring again to FIG. 1, the denser material from a first output of the fluidized bed concentrator 60 is enriched in Uranium, Radium, Thorium, etc. This enriched output material is then dried using a microwave oven 65 or other drying apparatus. The material exiting from a second output of the fluidized bed concentrator 60 which contains lighter material is fed to a second RXCP 70 in which the materials undergo chemical reactions in the presence of ammonia ($NH_3$). This step replaces conventional wet leaching in the presence of manganese oxide ($MnO_2$). The products of the reaction in RXCP 70 are output to a second fluidized bed concentrator 75 which again separates the products according to density. The denser output from the second fluidized bed concentrator 75 is enriched in Radium. This output is dried using microwave or similar drying means 80 ("drier"). It is again noted that for batch processing RXCP 55 and fluidized bed concentrator 60 can combined in a single UCP apparatus. Similarly, the UCP can also include a drier 80.

Exemplary Processes Used in Mining Beneficiation

There are a large number of chemical reactions employed in mining beneficiation or used on byproducts thereof that can be replaced by new non-polluting technologies based on the present disclosure and associated disclosures. The Universal Chemical Processor disclosed in U.S. patent application Ser. No. 17/508,427, the Fluidized Bed Concentrator disclosed in U.S. patent application Ser. No. 17/508,469, the Reactive X-ray Chemical Processor (U.S. Pat. No. 9,406, 478) as well as several known non-polluting processes including but not limited to crushing, grinding, screening, and filtration can be combined in multiple unique configurations to achieve novel beneficiation methods which are environmentally sound. Below are several exemplary processes which are implemented using the methodology of the present disclosure:

1. Manufacture of Hydrogen Peroxide:

To manufacture Hydrogen Peroxide ($H_2O_2$), purified water is used as the primary feedstock. In the RXCP mode, it is ionized and reacted with purified oxygen to produce $H_2O_2$ in the following reaction:

$$\frac{2H_2O + O_2}{\{\text{in the presence of X-rays}\}} \rightarrow 2H_2O_2 \quad (1)$$

This reaction can be adjusted to produce any concentration of $H_2O_2$ desired. It is noted that at concentrations above approximately 20%, the $H_2O_2$ becomes increasingly unstable to a point where it can explode. For most concentrations above 10%, a stabilizer chemical is added to mitigate this problem.

Traditional methods of production of $H_2O_2$ involve the use of large quantities of Ammonia, Sulfuric Acid, 2-ethylanthraquinone, ammonium persulfate, and others, all of which are toxic and considered environmental pollutants. The UCP/RXCP process eliminates all these materials and the downstream pollutants they produce. It requires just water, oxygen and electricity to make $H_2O_2$. If desired, and the energy is available, the incoming waste stream can be electrolyzed to produce the required amounts of oxygen with only hydrogen as a byproduct.

2. Manufacture of Phosphoric Acid, and Hydrofluoric Acid from Fluorapatite

Ore: The traditional wet chemistry process for manufacturing these products is:

$$Ca_5F(PO_4)_3 + 5H_2SO_4 + 10H_2O \rightarrow 3H_3PO_4 + 5CaSO_4 \cdot 2H_2O + HF. \quad (2)$$

From this formula, we see that $Ca_5F(PO_4)_3$ (Fluorapatite) is reacted with Sulfuric Acid ($H_2SO_4$) and water to produce Phosphoric Acid, Hydrofluoric Acid, and Phosphogypsum. Phosphogypsum (($CaSO_4 \cdot 2H_2O$) is the byproduct of this process and is a hydrate of Calcium Sulphate). The end products of this reaction are then subjected to further separation steps to isolate the individual compounds. To achieve the same end products using a plasma-based process, $Ca_5F(PO_4)_3$ is mixed with water and allowed to flow through an RXCP or UCP reactor. There, it is ionized and reacted with Hydrogen Sulfide gas and Oxygen to produce the same end products. Care must be taken in setting the reactor operating parameters to maintain the stoichiometry of the process. The reaction becomes:

$$Ca_5F(PO_4)_3 + 5H_2S + 10H_2O + 10O_2 \rightarrow 3H_3PO_4 + 5CaSO_4 \cdot 2H_2O + HF \quad (3)$$

Note that instead of $H_2SO_4$ being used as a liquid reactant (traditional process), the plasma process uses Hydrogen Sulfide and Oxygen as gaseous reactants which are better suited to the plasma process. In the preferred embodiment, with the correct choice of operating conditions, it is possible to get the Phosphoric acid to come off as a liquid, the Phosphogypsum to come off as a solid (precipitate), and the HF to come off as a gas. This eliminates the need for further process steps. If it is desirable for the HF to come off as a liquid, then additional process steps are required. The advantage that the UCP brings to this process is that there are no toxic liquid wastes as any unwanted byproducts are given off as gases and can be destroyed by pyrolysis unit pollution control equipment on the exhaust of the process pumps. This is an incinerator placed in series with the exhaust of the process pumps and the building exhaust to the atmosphere. The use of plasma technology is standard in modern semiconductor processing. It is noted that there are other plasma based approaches to achieve the same end products.

3. Separation of Actinides from Fluorapatite or Phosphogypsum:

Fluorapatite rarely occurs by itself. It is normally found in combination with Hydroxyapatite [$Ca_5(PO_4)_3OH$], a variety of rare earths (Lanthanides) and radioactive minerals (Actinides), typically Uranium, Radium, and Thorium. Other Actinides are frequently found in smaller quantities as well. It is thus necessary, at some point, to separate the Actinides from the Fluorapatite (or Phosphogypsum) and Lanthanides. Depending on local conditions and regulations at the mining site, this separation can be done either before or after the Fluorapatite reaction described in #2 (above), but usually it is done before so as to not create a large volume of radioactive waste. It is desirable to remove any radioactive materials (Actinides) from Fluorapatite or Phosphogypsum (a byproduct of fertilizer, hydrofluoric Acid, and Phosphoric Acid manufacturing) so that these products and the residual Phosphogypsum can be safely used for other purposes. The existing wet chemical processes produce large amounts of toxic pollutants. In some cases, the use of the UCP eliminates wet chemistry entirely and its associated pollutants when the Actinides are not chemically bound to the phosphogypsum. In this case, the UCP is used in fluidized bed mode. The Fluorapatite or Phosphogypsum (feedstock, in this specific case) is introduced as a dry powder and fluidized with (typically) air. This causes portions of the feedstock to rise to the top of the column and the Actinides to fall to the bottom of the column where they exit the column from the respective outlet ports 140 for the Phosphogypsum and 142 for the Actinides. When the UCP is used in this mode, the separation is accomplished on the basis of the density of the particles. In cases where the compounds are chemically bound, it is appropriate to use a reactive plasma step before the physical separation step to achieve complete separation of the radioactive materials from the feedstock.

There are other means of separating Actinides and Lanthanides from Phosphogypsum or Fluorapatite. Typically, Uranium, Thorium and Radium are the primary Actinides found in Phosphogypsum. One such means involves reacting the Actinide (as a Hydrate) with either water and NO (Nitric Oxide, as a gas), or HCL (as a gas) to produce:

$$ACT(OH)_3 + 3HNO_3 \rightarrow ACT(NO_3)_3 + 3H_2O$$

$$ACT(OH)_3 + 3HCl \rightarrow ACTCl_3 + H_2O \quad (4),(5)$$

where ACT stands for the specific Actinide compound. Alternatively, Uranium or Thorium may be separated out using ammonia and carbon dioxide gases with ammonium hydroxide (aqueous ammonia) as a commercially saleable byproduct.

$$UO_2(OH)_2 + 3(NH_4)_2CO_3 \rightarrow (NH_4)_4[UO_2(CO_3)_3] + 2NH_4OH \quad (6)$$

The specific reaction chosen is dependent on the available raw materials, which may be used as is or with some degree of preprocessing to adjust both the mechanical and electrical properties of these materials.

Process Equipment
Fluidized Bed Concentrator

According to the present disclosure, fluidized bed concentrators (hereinafter referred to as FB concentrators) are used for separating the products of mining and beneficiation including mining ores, wastes, tailings and byproducts. The fluidized bed methods and apparatus disclosed herein can achieve metrics of conventional concentration and separation without producing toxic liquid waste products and thereby addresses a long felt need in the mining industry for a pollution-free means of extracting Actinides from ore, waste streams, and mine tailings. The fluidized bed methods and apparatus can be used for extracting other materials based on particle size and density as well.

Figure 3:
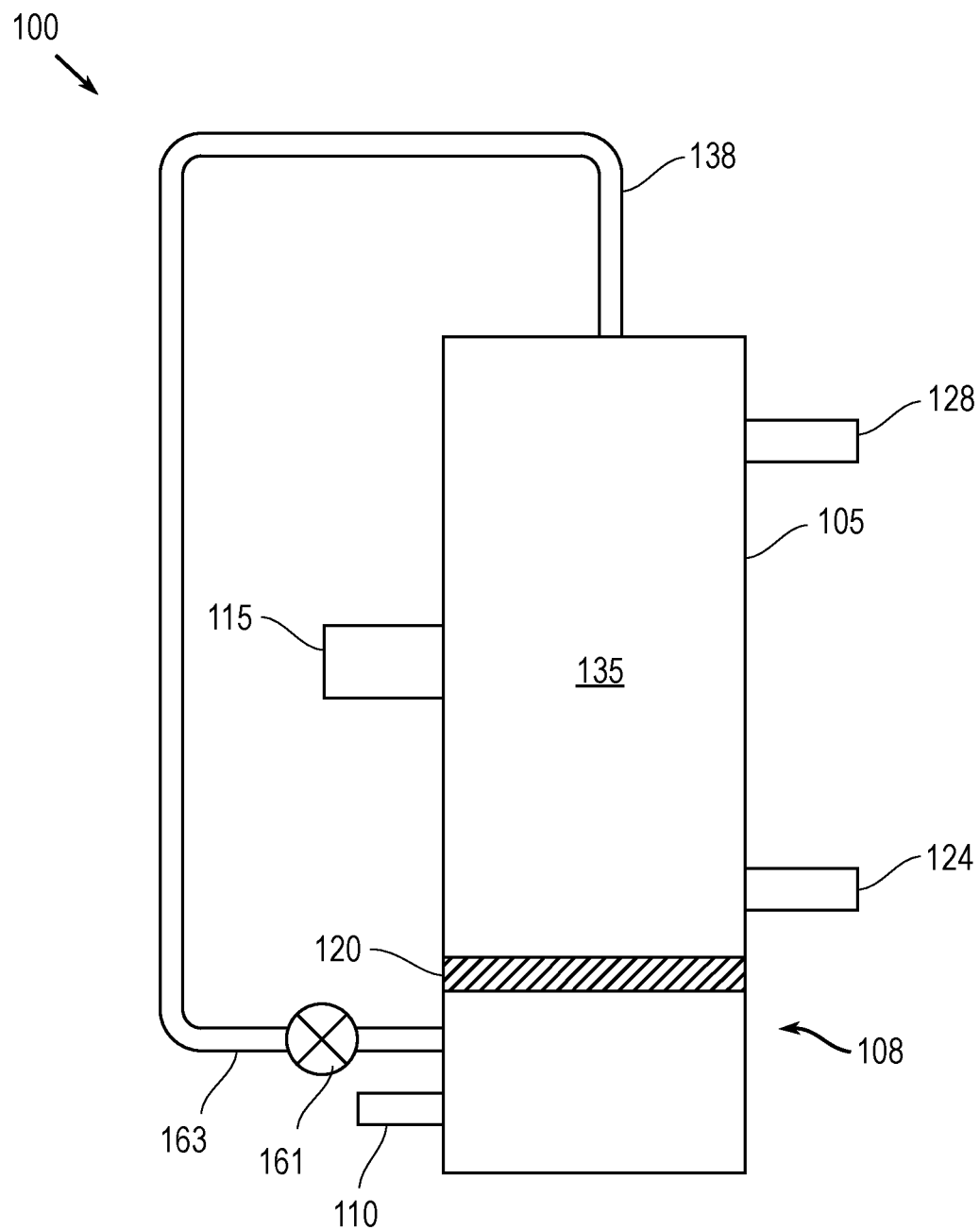
FIG. 3 is a schematic cross-sectional view of an embodiment of a Fluidized Bed Concentrator that can be used in a mining beneficiation process according to the present disclosure.

FIG. 3 is a cross-sectional view of an embodiment of a fluidized bed concentrator apparatus according to the present disclosure. The preferred embodiment of the fluidized bed separator 100 comprises a generally cylindrical or columnar vessel 105 in this case having a vertical, longitudinal central axis. The long vertical dimension of the vessel is referred to as its "height" and vertical positions in the vessel are referred to as being at different heights, i.e., lower or higher, in the vessel. It is noted that the FB concentrator can be oriented differently and can have a horizontal or tilted longitudinal axis, although for most operations, the vertical orientation is preferred. If oriented in the horizontal plane, certain components of the FB concentrator need to be along the new "bottom" of the device in order for gravity to be able to participate in the operation of the FB concentrator. The vessel includes a base section 108 at which an inlet port 110 for a fluidizing medium is located. The inlet port can be welded, molded or fitted to the vessel 105 as known in the art. An isolation valve 112 can be coupled to the inlet port 110 to cut off or modulate the flow of the fluidizing medium when not needed. A fluidizing medium is delivered into the vessel 105 via the inlet port 110 at higher than atmospheric pressure. The fluidizing medium is introduced under pressure in a uniform fashion across the entire bottom of the vessel. The fluidizing medium can comprise a uniform gas such as compressed air, or a uniform liquid such as water. Alternatively, the fluidizing medium can include a mix of gases, or liquids. A wide range of liquids and gases can be used depending on the intended process. As an example, nitrogen or argon can be used as the fluidizing medium in lieu of compressed air if the material being processed (e.g., separated) can be adversely affected by the presence of oxygen. The choice of fluidizing medium is dependent on the desired end product.

In the embodiment shown in FIG. 3, a feedstock inlet port 115 is coupled to the vessel near a midpoint of the height of the vessel, although this positioning of the inlet port 115 is advantageous but not necessary. The feedstock inlet port provides a conduit through which a feedstock is delivered into the vessel. The diameter of the feedstock inlet port 110 has a size designed to accommodate the feedstock product at the flow rate anticipated. The feedstock can be granular solid, liquid, gaseous or plasma material which is intended to be concentrated and separated in the vessel. In a preferred embodiment, the feedstock comprises mineralogical material from ores, wastes and tailings. The material can be granulated into a dry powder and input to the vessel or can be incorporated in a liquid or gaseous carrier medium. As noted above, the feedstock material can contain Rare Earths (Lanthanides) and Actinides which are important (and valuable) to separate out from other components of the feedstock material for various reasons. In one advantageous implementation, the feedstock is phosphogypsum from a waste storage stack, which is a byproduct of phosphate-based fertilizer production. The phosphogypsum feedstock can include a large number of contaminants including Rare Earths and Actinides (radioactive elements). The feedstock can be delivered into the feedstock inlet port continuously or in batches (referred to as batch mode), and the contaminants can be separated out for further processing or for use as is.

The fluidizing medium that enters the vessel is forced through a diffuser plate 120 positioned above but proximal to the base 108 of the vessel. The diffuser plate 120 can be made from a variety of materials, so long as they are appropriately porous or have a uniform pattern of holes to achieve the same effect. The diffuser plate 120 has the effect of distributing and increasing the uniformity of the fluidizing medium as it enters the main chamber 135 of the vessel at which separations take place (this region can also be referred to herein as the "separation region"). As the feedstock material enters the main chamber 135 of the vessel it becomes entrained in the fluidizing medium. The resulting combination of solid and fluid behaves as a fluid (i.e., undergoes fluidization) under certain controlled conditions. Fluidization occurs when various factors and parameters, including the dimensions of the vessel, the pressure drop across the bed, the average particle density, feedstock, and reactant flow rates, and other factors (discussed below) have magnitudes that are designed to cause the feedstock and fluid mixture to behave as a fluid. In the depicted embodiment, this is achieved by the introduction of pressurized fluidized medium through the particulate medium at the base of the vessel of an appropriate diameter. The combined granular solid/fluid medium, referred to as the fluidized bed, is a suspension, and has many of the properties of normal fluids, such as the ability to free-flow under gravity, or to be pumped using fluid-type technologies. It is this aspect of fluidized beds that allows horizontal operation. A recirculation pipe 138 receives the pressurized fluidized medium the top of the chamber, applies pressure to the fluidizing medium via a pump 161 and reapplies the fluidizing medium at the bottom of the chamber at a reentry port 163, mixing it with the incoming fluidizing medium. As noted above, additional fluidizing medium incoming from inlet port 110 can be cut off when need via isolation valve 114. However, additional fluidizing medium is typically needed to offset volume loss and maintain constant pressure within the FB concentrator as product is removed.

Within the main chamber 135 or separation region of the reactor vessel, the upper surface of the bed is relatively horizontal or can be wave-like in nature, which is analogous to hydrostatic behavior. The bed can be considered to be a heterogeneous mixture of fluid and granular solid that can be represented by a single bulk density. Inside the fluidized bed, larger and denser particles tend to move downwards in the bed while smaller, lighter particles tend to move upwards, exhibiting fluid behavior in accordance with Archimedes' principle. As the density (more precisely, the solid volume fraction of the suspension) of the bed can be altered by changing the fluid fraction, objects with different densities in comparison to the average density of the bed can be caused to sink or float. The upwards force of the fluidizing medium is the strongest contributor to the upward motion of the particles.

In fluidized beds, the contact of the granular solid particles with the fluidization medium is greatly enhanced when compared to packed beds. This behavior in fluidized combustion beds enables a high degree of thermal transport inside the system and heat transfer between the particles and the fluidizing medium. The enhanced heat transfer enables thermal uniformity analogous to that of a well-mixed gas, and the fluidized bed can have a significant heat-capacity while maintaining a homogeneous temperature field. As noted above, in a fluidized bed, the denser materials tend to go to the bottom of the FB. It should be noted that very small dense particles can move to the top of the FB. This creates a need for a further separatory operation. This is due to a simple gravitationally induced process. As an example, if air is used as the fluidizing medium, the flow upward through the bed of materials causes the material in the bed to essentially float on the fluidizing medium. When the material is floating, it means there is sufficient pressure to fluidize the whole column and push the lighter materials towards the top of the column while the denser portions of the material stay at or move to a lower elevation in the column.

The condition for fluidization can be presented by equation (1) below in which the apparent pressure drop multiplied by the cross-section area of the bed is equated to the force of the weight of the granular solid particles (less the buoyancy of the solid in the fluid).

$$\Delta p_w = H_w (1-\varepsilon_w)(\rho_s - \rho_f) g = [M_s g/A][(\rho_s - \rho_f)/\rho_s] \qquad (7)$$

in which $\Delta p_w$ is the bed pressure drop, $H_w$ is the bed height, $\varepsilon_w$ is the bed voidage, (i.e. the fraction of the bed volume that is occupied by the fluid spaces between the particles), $\rho_s$ is the apparent density of bed particles, $\rho_f$ is the density of the fluidizing fluid, g is the acceleration due to gravity, $M_s$ is the total mass of solids in the bed, and A is the cross-sectional area of the bed.

Returning again to FIG. 3, as the feedstock material is separated by density, with heavier components migrating toward the lower region of the vessel, the denser components are removed from a lower output port 124 (or plurality of such ports) positioned toward the bottom of the main chamber above the diffuser plate 120. Lighter components migrate toward the upper region of the vessel and are removed via an upper output port 128 (or a plurality of such ports) positioned at or near the top of the main chamber 135. The height of the port and particle size and density determines the density of the material being removed. The separated material is pushed out of the fluidized bed through the output ports 124, 128 by the internal pressure within the bed. The output ports 124, 128 can be connected to subsequent separation stages (i.e., addition FB concentrators or other processing devices) which can vary widely depending on the material being processed. The inlets and outlets are equipped with valves under the control of an electronic controller (not shown) which may be a host computer configured to open, close or modulate the outlets according to a program or according to the commands of an operator.

Additionally, the introduction of the fluidizing medium into main chamber 135 has the effect of creating bubbles which form as a result of physical interactions with particles of the feedstock material and pressure differentials. In a physically small bed, the bubbles formed are small and sometimes microscopic. In a large-scale industrial bed, which can be ten to fifteen feet in diameter, the bubbles can be quite large. The bubbles increase the mixing of chemicals in the fluidized bed. A means of venting the pressure (e.g., a relief valve) 138 is included at the top of the vessel to allow a constant differential pressure environment to be maintained within the bed. Pressure relief is preferably achieved by means of recirculating piping, particularly when the fluidizing medium is reused. When a given bubble or molecule of air reaches the upper region of the bed, velocity of the air suddenly drops by almost factor of 10 due to the increase in diameter of the bed. This means lighter (less dense) particles will collapse back into the turbulent region where they recirculate and eventually reach a height in the bed that is stable, based on the particle size, density and fluidizing medium pressure. It is noted that fluidized beds can be run at atmospheric pressure, positive pressure, or under partial vacuum.

A variety of material mixtures can be separated using the fluidized bed. And as noted, granular solids, gases, liquid, or mixed gases can be utilized as the fluidizing medium. Specific materials and fluidizing means are chosen as appropriate to the specific task at hand. If batch-oriented processing is intended, the fluidized bed method can achieve high levels of separation by running the process for an extended period of time. If, however, a continuous process is desired, such as is typically found in industrial scale applications, then the fluidized bed may be modified to include means for continuously introducing a material to be processed, and a means to remove the separated materials of differing densities. Multiple stages comprising multiple fluidized beds in distinct vessels may be required to achieve the desired degree of processing and/or separation.

According to the present disclosure, the fluidized bed concentrator is intended to be a substitute for flotation, settling, some precipitation, and some sedimentation processes typically found in mining beneficiation processes. The most significant advantage is that the separation is performed without the use of toxic and environmentally unsound chemicals or, in most cases, any process water. The separation proceeds due to the properties of the fluidized bed constituents, which thoroughly mixes the component feedstock materials and then effectively segregates the materials by density over a period of time. The lower and upper outputs, 124, 128 can have mass spectrometers or other analytical instruments connected to them so that an online analysis of the separation streams can be performed with the FB concentrator while operating.

Figure 4:
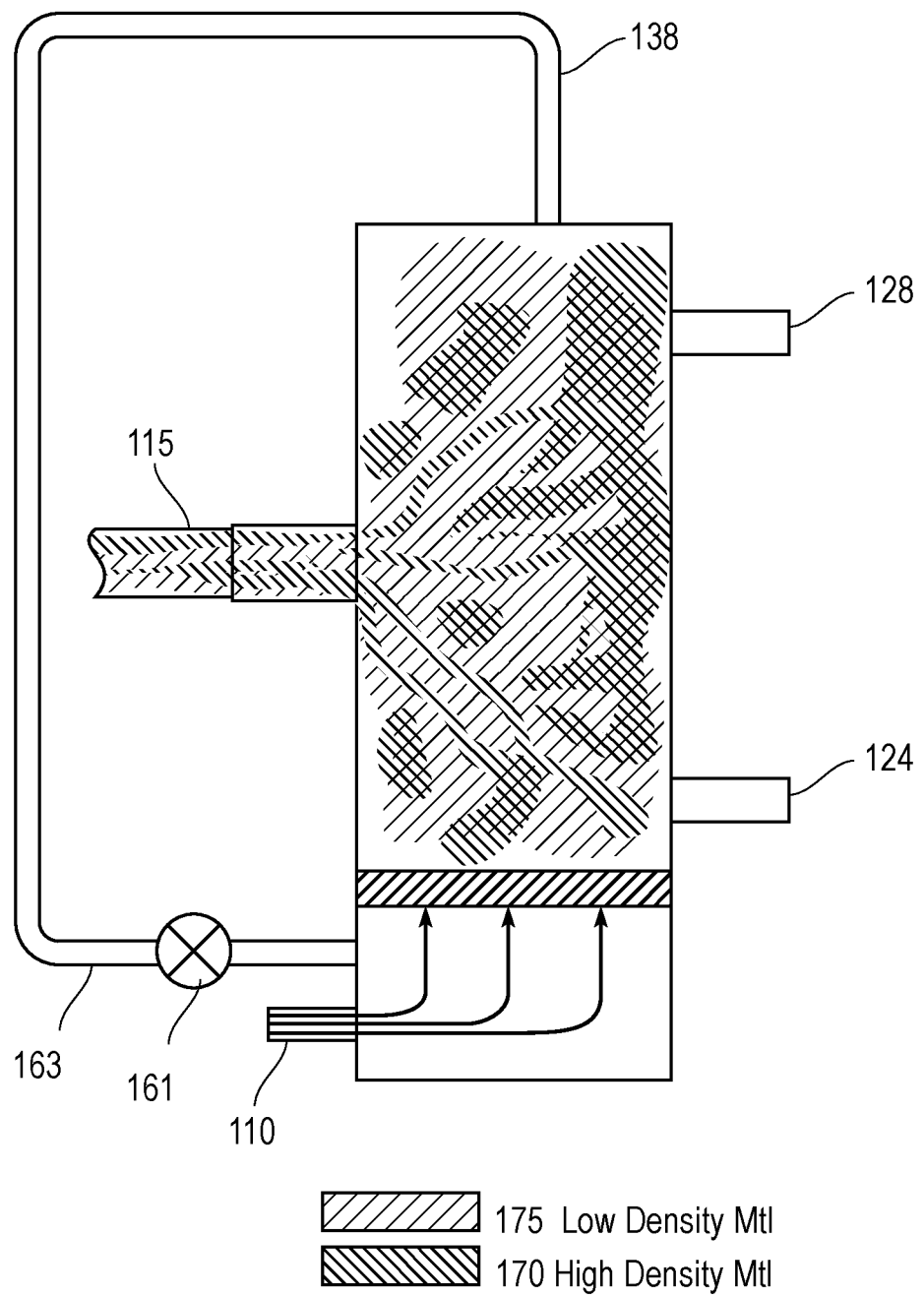
FIG. 4 is a schematic cross-sectional view showing a exemplary first stage of a separation process according to the present disclosure using the fluidized bed concentrator.
Figure 5:
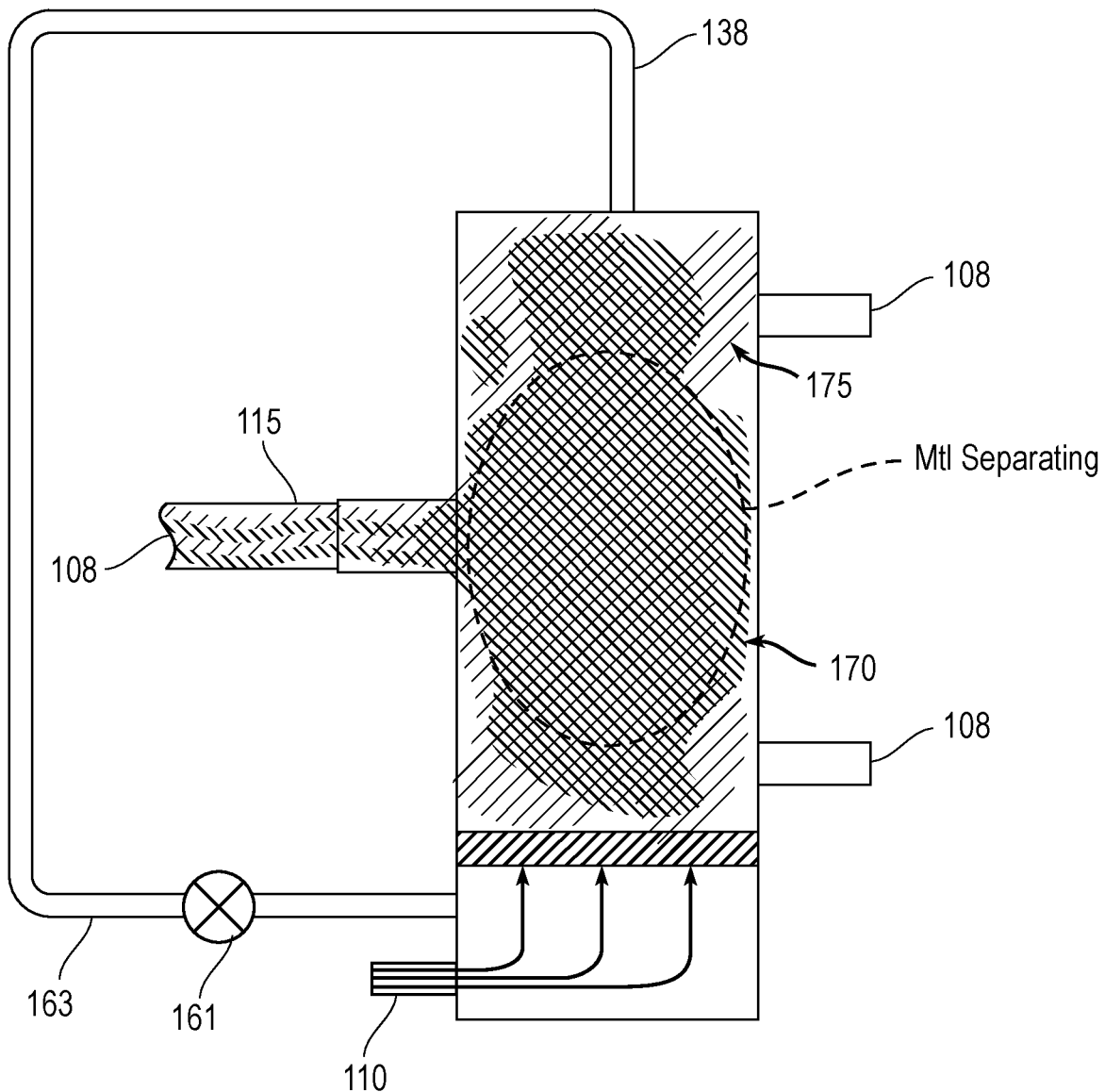
FIG. 5 is a schematic cross-sectional view showing an exemplary second stage of a separation process according to the present disclosure using a fluidized bed concentrator.
Figure 6:
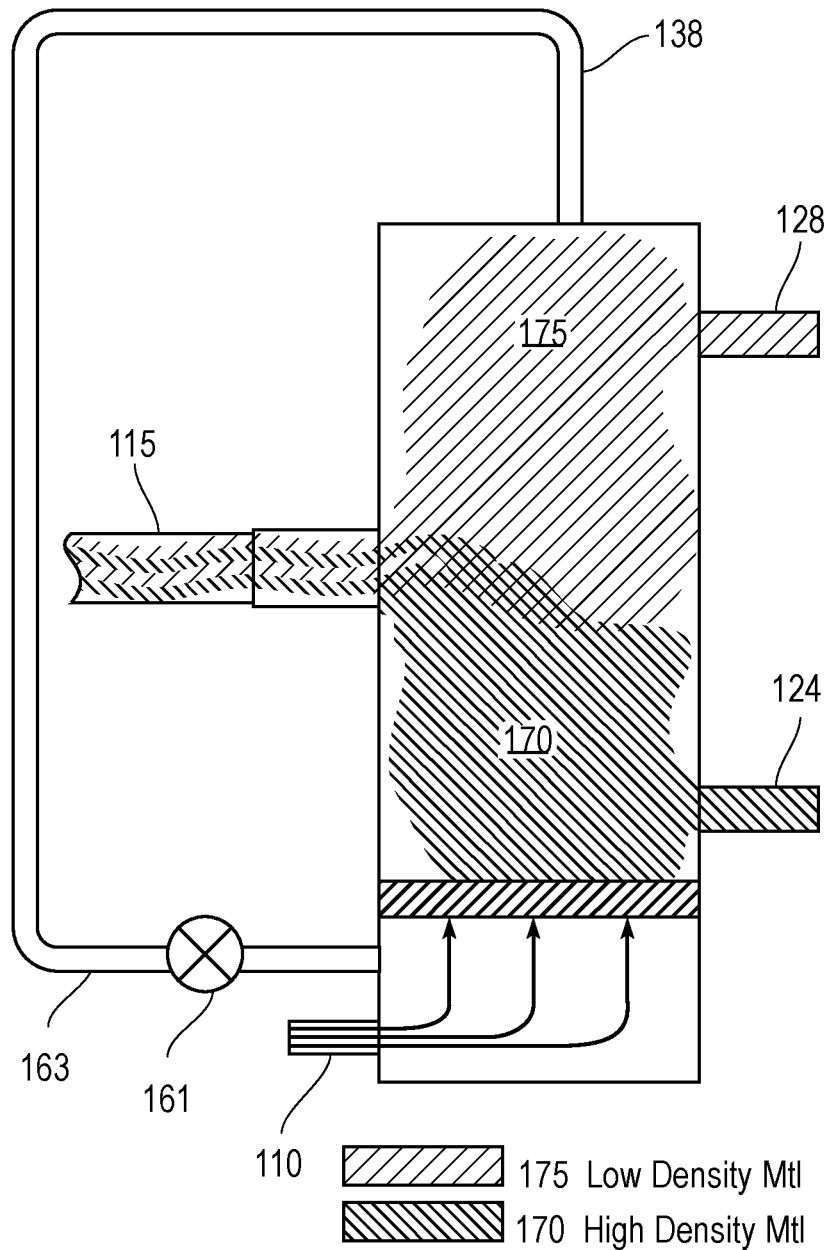
FIG. 6 is a schematic cross-sectional view showing an exemplary third stage of a separation process according to the present disclosure using a fluidized bed concentrator.

FIGS. 4-6 show stages of an exemplary sequence of a separation process according to the present disclosure using the Fluidized Bed Concentrator. In FIG. 2, a feedstock containing mainly first and second components (components A and B) of different densities enter through the feedstock inlet 115 into the main chamber 135 (separation zone) of the FB concentrator in which a fluidized bed is maintained through the supply of the fluidizing medium through fluidizing medium inlet 110. In the example shown, component A is denser than component B. As shown in FIG. 2, as the feedstock material enters the main chamber 135, the feedstock material initially diffuses out in a generally random fashion into the volume of the chamber.

By the second stage of the process shown in FIG. 3, the feedstock material has spread throughout the volume of the fluidizing bed and has begun to separate out into a first partially separated mixture 170 located toward the bottom of the main chamber at which the denser component (A) is concentrated at a higher level relative to the feedstock and into a second region 175 located toward the top of the main chamber at which the less dense component (B) is concentrated at a higher level relative to the feedstock. At the second stage shown in FIG. 3, the separation process is in an early or intermediate point. A concentration gradient has begun to form, but the components have not been completely separated.

At the third stage shown in FIG. 4, components A and B have separated more fully and the regions 170 and 175 contain substantially one component or the other (i.e., there is very little of component A in region 175 and very little of component B in region 170. At this point the lower and upper outlet ports 124, 128 are opened to allow a separated output from the concentrator. A fluid with a high concentration of component A flows out of the vessel through the lower output 124, and a fluid with a high concentration of component B fluid out of the vessel through the upper output 128. As noted above, the output streams at outlet ports 124, 128, while greatly concentrated relative to the input feedstock may not be sufficiently concentrated for desired purposes and the outputs can be input to further FB concentrators or other processing devices to further separate out the components. Additionally, as noted above, the fluidizing medium is recirculated via recirculation pipe 138 and pump 161 to maintain the volume and pressure of the fluidizing medium in the fluidized bed.

The fluidized bed separation process of the present disclosure can be enhanced by the use of screening both before and after the fluidized bed operation. Screening involves mechanically separating granulated material into multiple grades by particle size using a screen. Screening enables the number of fluidized bed stages can be reduced, leading to additional improvements in cost, footprint, safety and throughput.

In one important application, the fluidized bed can be used as a means of separating materials on the basis of their density in the beneficiation of Lanthanides and Actinides. Because there are no chemical reactions involved in the basic fluidizing bed separation, the fluidized bed can be implemented in a simpler manner than that usually found in the chemical industry, for example the fluidized beds used in the manufacture of polyethylene.

Reactive X-Ray Chemical Processor (RXCP)

In addition to fluidized bed methods for separation and concentration, the present disclosure presents additional methods and apparatus for beneficiation of mineralogical materials plasma-based processes using a Reactive X-Ray Chemical Processor, employed in either RXCP or FXI mode. Commonly owned U.S. Pat. No. 9,406,478 describes the RXCP in detail, but salient features of the apparatus are set further below. As previously mentioned, any place the RXCP is called for, the UCP can be substituted.

Figure 7:
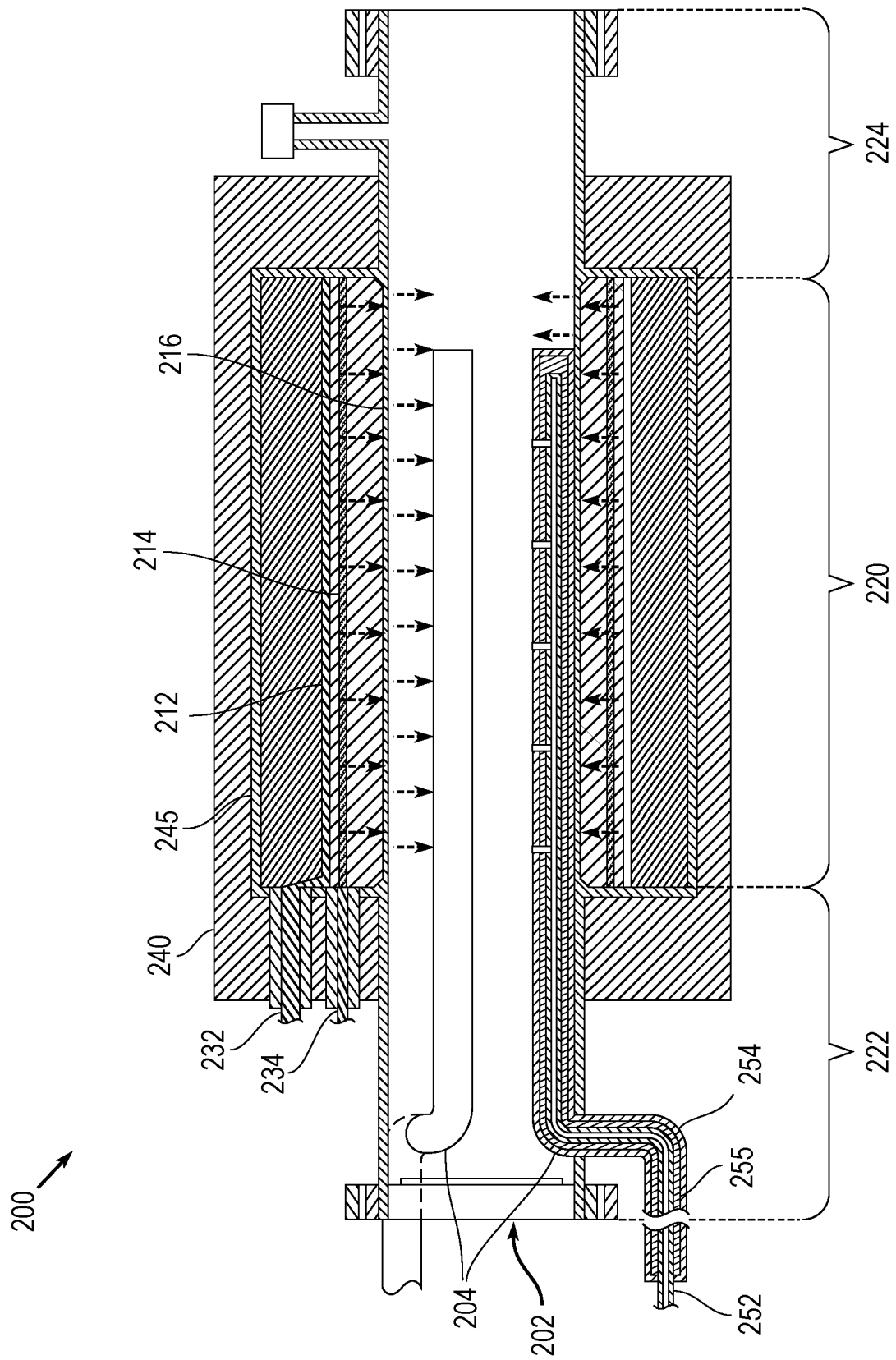
FIG. 7 is a cross-sectional view of an embodiment of a Reactive X-ray Chemical Processor (RXCP) that can be used in beneficiation of mineralogical resources according to the present disclosure.

FIG. 7 shows an RXCP 200 that can be used for beneficiation of mineralogical materials according to the present disclosure. The basic process of the (RXCP) 300 starts with the total or partial ionization of all or part of the feedstock reactant which is input through a feedstock inlet 202, and all other reactants, input through one or more radiation-shielded reactant injectors 204. This causes the feedstock and reactants to be rendered into a plasma. This is then followed by recombination of the resulting mix of atomic species into their lowest energy states. The resulting mix of atomic species produces an output flow 210. An RXCP 200 uses a cylindrical cold field emission hollow cathode 212, a hollow grid 214, and a hollow anode 216 transmission-type X-ray source in conjunction with reactant measuring, control, and injection systems (not shown in FIG. 7) located in the central region of the device. The cold field emission cathode 212, a grid 214 that together comprise an electron gun. The structure of the transmission x-ray tube starts with a hollow cathode 212 within which there is a coaxially oriented hollow grid 214, within which there is a coaxially oriented hollow anode 216, all arranged such that their central axes are coincident. The electron gun of the RXCP can achieve a theoretical maximum current density of approximately 80,000 Amps/cm$^2$ in the pulse mode, which ultimately allows high levels of irradiation due to the high fluence created by the large number of electrons used to create the X-ray beam. In practical applications, the cathode 212 is not loaded to its theoretical maximum, but rather to some lesser value. For instance, the RCP 200 can achieve high X-ray photon energies of typically 0.025-5 MeV, and a high beam current that can typically range from KiloAmps to many MegaAmps. The RXCP can operate at lower current levels, which are dependent on the fluence requirements of the specific reaction.

In operation, the cathode 212 is charged using a power supply (not shown in FIG. 7) which meets the voltage, current, and, if used in the pulse mode, risetime and pulse repetition-rate requirements. A bias resistor (also not shown) is connected between the cathode 212 and the grid 214 and is used to create a voltage on the grid 214 so that the tube is normally in a standoff condition (not conducting). When a control signal of ground potential is applied to the grid 214, the grid releases control of the cathode 212 and the cathode discharges. Electrons 210 then travel from the cathode 212 to the anode 216. When they strike the anode 206, they generate X-radiation 212 and secondary electrons. The X-rays and secondary electrons are liberated from an X-ray emitting (inner) surface of the anode 216 in an isotropic fashion. Due to the relatively thin wall of the hollow anode 216, a substantial portion of the x-rays and secondary electrons generated (about 50%) propagate into the central region of the hollow anode. The penetration depth of the incident electrons is controlled by the balance between the cathode voltage and the thickness of the anode 216. The anode 216 typically has a thin wall section in the region of the irradiation volume to achieve a degree of control over the desired transmitted irradiation. The anode wall section thickness is a function of the diameter of the interior space, the cathode voltage, and the atomic number (Z) of the anode. The secondary electrons released from the anode play an important role because they dramatically increase the number of potential reactions. Each liberated secondary electron can, in turn strike atoms within the anode, causing further X-ray emission and release of additional secondary electrons. This cascade effect of the secondary electrons helps ensure that a realistic energy balance can be achieved. Cathode voltage is supplied through cathode electrically insulated vacuum feedthrough 232, and grid voltage is supplied through electrically insulated vacuum feedthrough 234. Both feedthroughs 232, 234 are electrically insulated and high vacuum sealed, and penetrate the biological radiation shield 240 and housing 245.

To preserve the molecular structure of reactants prior to injection, it is necessary to provide an X-radiation shielded injection means. This prevents premature dissociation, or premature partial or total ionization, of the injected reSactant 204 prior to one or both of introduction of the feedstock material 202 into the irradiation volume 220 and introduction of reactant 206. The requirements for a shielded injection means are preferably met by providing concentric pipes 252 and 254 with an X-ray radiation shielding material 255, which is typically lead or another high atomic number element, filling the interstitial space between the concentric pipes. The pipes 252 and 254 are typically stainless steel or some other non-reactive material that is compatible with, and not affected by, the feedstock and reactants 202, 204, 206 or the radiation environment in irradiation volume 220.

The RXCP section of the UCP can be operated as a Flash X-ray irradiator (FXI). In FXI mode, high-intensity x-radiation is applied to the reaction zone typically with reactant feeds switched off. In this mode, feedstock is generally input through the feedstock input port with the remaining ports switched off. However, in some circumstances, the other inlet ports can be used to supply materials in the FXI mode.

Depending on the materials present in the reaction (radiation) zone, decomposition, and cross-linking are typical of reactions that can occur in this mode. In this context, decomposition refers to what happens to complex molecules when subjected to intense X-ray irradiation, in which the X-rays are substantially in excess of the K-edge binding energies of the individual elements involved. This particular process is useful when organic components are present and it is desired to have them removed. The intense X-ray irradiation in FXI mode destroys any organic material. and decomposes it to its constituent elements which then recombine to their lowest energy state forms. Additionally, it is well known that ionizing radiation (X-rays) are capable of initiating cross-linking reactions in polymers and the like. By setting the correct operating parameters, the FXI easily achieves this operating environment. A detailed description of these processes and others is found in commonly-owned and assigned U.S. Pat. No. 8,019,047. For ease of reference, in this application the component used to generate X-rays in either the RXCP mode or the FXI is referred to as the RXCP.

Among other uses, the RXCP can be used to beneficiate Fluorapatite [$Ca_5F(PO_4)_3$] via a plasma-based reaction process where is mixed with water and allowed to flow through the RXCP. In the RXCP reactor radiation zone it is ionized and reacted with Hydrogen Sulfide gas to produce end products of Phosphoric acid, Hydrofluoric acid and Calcium Sulfate. The plasma process uses Hydrogen Sulfide and Oxygen as gaseous reactants which are suited to the plasma process. In the preferred embodiment, with the correct choice of operating conditions, it is possible to get the Phosphoric acid to come off as a liquid, the Phosphogypsum to come off as a solid (precipitate), and the HF to come off as a gas. It is noted that Phosphogypsum, normally considered a byproduct but which can be harvested for its mineralogical content, can be processed by similar means to extract the minerals that it contains.

Universal Chemical Processor (UCP)

The material separation capability of the fluidized bed concentrator can be combined with the capabilities of the RXCP to induce chemical reactions in a single device referred to as a Universal Chemical Processor. These capabilities are further enhanced by the addition of both electromagnetic and electrostatic field sources which provide the ability to conduct reactions under the influence of these fields which will enhance certain reactions.

Figure 8:
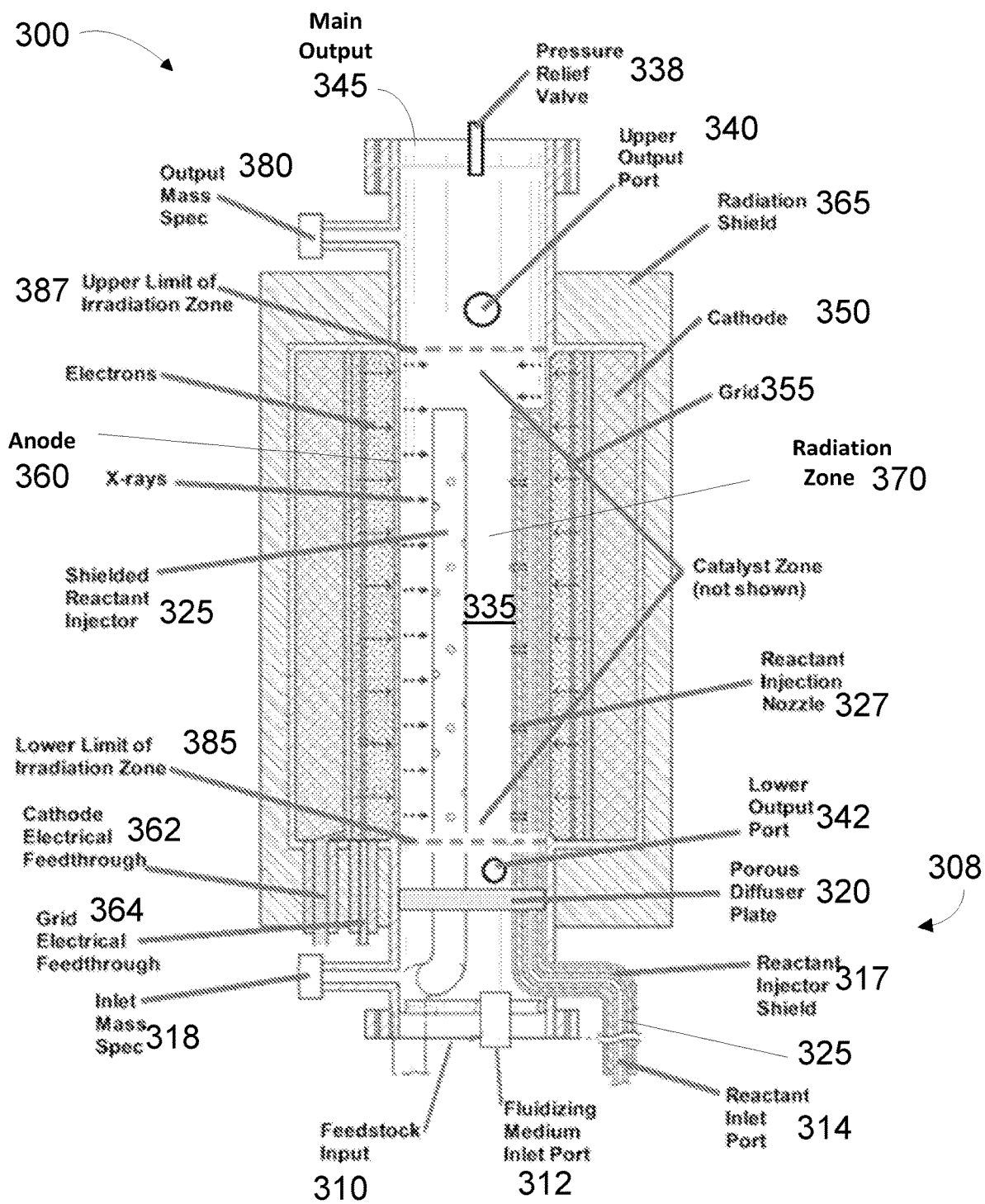
FIG. 8 is a cross-sectional view of an embodiment of the Universal Chemical Processor (UCP) that can be used in beneficiation of mineralogical resources according to the present disclosure.

FIG. 8 is a cross-sectional view of an embodiment of the UCP according to the present disclosure. The UCP 300 comprises a generally cylindrical or columnar vessel 305 in this case having a vertical, longitudinal central axis. It is noted that the UCP can be oriented differently and can have a horizontal or tilted longitudinal axis, although for fluidized bed operations, in most cases, the vertical orientation is preferred. At a base 308 of the vessel 305, which is the lower part as shown in FIG. 1, several input ports are situated that can be welded, molded or otherwise fitted in a leak-proof fashion to the vessel 305 as known in the art. In the embodiment shown, a feedstock inlet port 310 is coupled to the base 308 of the vessel and provides a conduit through which a feedstock is delivered into the vessel. As the feedstock typically has a larger diameter than other introduced materials, the diameter of the feedstock inlet port 310 has a corresponding size to accommodate the feedstock product. The feedstock comprises a granular solid, liquid, gas, or plasma material which is intended to be processed in the vessel in some manner. For example, the feedstock can be introduced into the vessel in order to undergo one or more chemical reactions, to separate out the components of the feedstock fluid, for reactive chemical processing, catalytic cracking, combustion, heat or mass transfer, product separation, or interface modification (e.g., applying a coating onto solid items). In one advantageous implementation, the feedstock is Phosphogypsum from a waste storage stack, which is a byproduct of fertilizer production, which can include a large number of contaminants including Rare Earths and radioactive elements. The feedstock can be delivered into the feedstock inlet port 310 continuously (referred to as continuous mode) or in batches (referred to as batch mode), and the contaminants can be separated out for further processing or for use as is. The feedstock can also be delivered using other ports such as the reactant injector ports.

The UCP can be operated in a fluidized bed operating mode ("FB mode") which can be used for materials separation or other purposes. The UCP includes a fluidizing medium inlet port 312 positioned adjacent to the feedstock input port at the base 308. In the FB mode, a fluidizing medium is delivered into the vessel 305, typically at higher than atmospheric pressure through the fluidizing medium inlet port 312. The fluidizing medium is introduced under pressure in a uniform fashion across the entire bottom of the reactor. The fluidizing medium can comprise a uniform gas such as compressed air, or a uniform liquid such as water. Alternatively, the fluidizing medium can include a mix of gases, plasma, or liquids. A wide range of liquids and gases can be used depending on the intended process. As an example, nitrogen or argon can be used as the fluidizing medium in lieu of compressed air if the material being processed (e.g., separated) can be adversely affected by the present of oxygen. Various plasmas may be used as well with the effect of causing additional reactions to occur. The choice of fluidizing medium is dependent on the desired end product. Preferably, the fluidizing medium port and injector is shielded against X-ray irradiation as the UCP can also be used in RXCP or FXI as described below. The shielding can be implemented by forming the inlet port using concentric pipes layered with filler material composed at least in part of a material resistant to X-ray radiation such as lead. An isolation valve (not shown in FIG. 1 for clarity) can be coupled to the fluidizing medium inlet port 312 to cut off or modulate the flow of the fluidizing medium when not needed.

In addition to the feedstock and the fluidizing medium, additional reactants for promoting one or more chemical reactions, heat transfer, catalysis or otherwise can be introduced into the vessel via one or more reactant inlet ports 314 also situated at the base 308. Like the fluidizing medium port, the reactant inlet port 314 is preferably shielded against X-ray irradiation. In one embodiment, the reactant inlet port is surrounded by a shield 317 that can be formed of concentric pipes with filler material between the concentric pipes composed at least in part of a material resistant to X-ray radiation such as lead. The outer pipe should be constructed of a material that will not react with the other materials present in the reaction zone such as 316 stainless steel or titanium. In the depicted embodiment, unlike the feedstock and fluidizing medium inlet ports 310, 312, reactant inlet port does not deliver reactants into the base of the vessel, but rather the reactant inlet port leads to a reactant injector 325 having a plurality of outlet nozzles e.g., 327 positioned at various heights in the vessel. The shield 317 allows reactants to be introduced without their being ionized until they are in the reaction chamber 335 and are introduced into the reaction zone in a uniform fashion. In some implementations (not depicted), the feedstock inlet port 312 can be configured similarly to the reactant inlet port to introduce material into the middle of the chamber 335, preferably with fewer nozzles, each nozzle having a larger diameter than those of the reactant inlet nozzle.

The operation of the fluidized bed can be enhanced by one of several means in the UCP. First is by initiation of a plasma within the fluidized bed zone. This can be accomplished by one of several means. One is to turn on the X-ray emitter of the RXCP. This provides high energy radiation to ionize and enhance the reaction characteristics. A second way is to apply a high voltage DC signal to the insulated electrodes (which can also function as a heater or drier). This produces a lower energy plasma than is generated using X-rays. A third way is to apply an RF signal, again either through the insulated electrodes or through the heater. This produces a plasma with energy between that produced by X-ray and that produced by DC. The choice of ionization means would be dependent on the desired end result from the resultant reaction.

Figure 9:
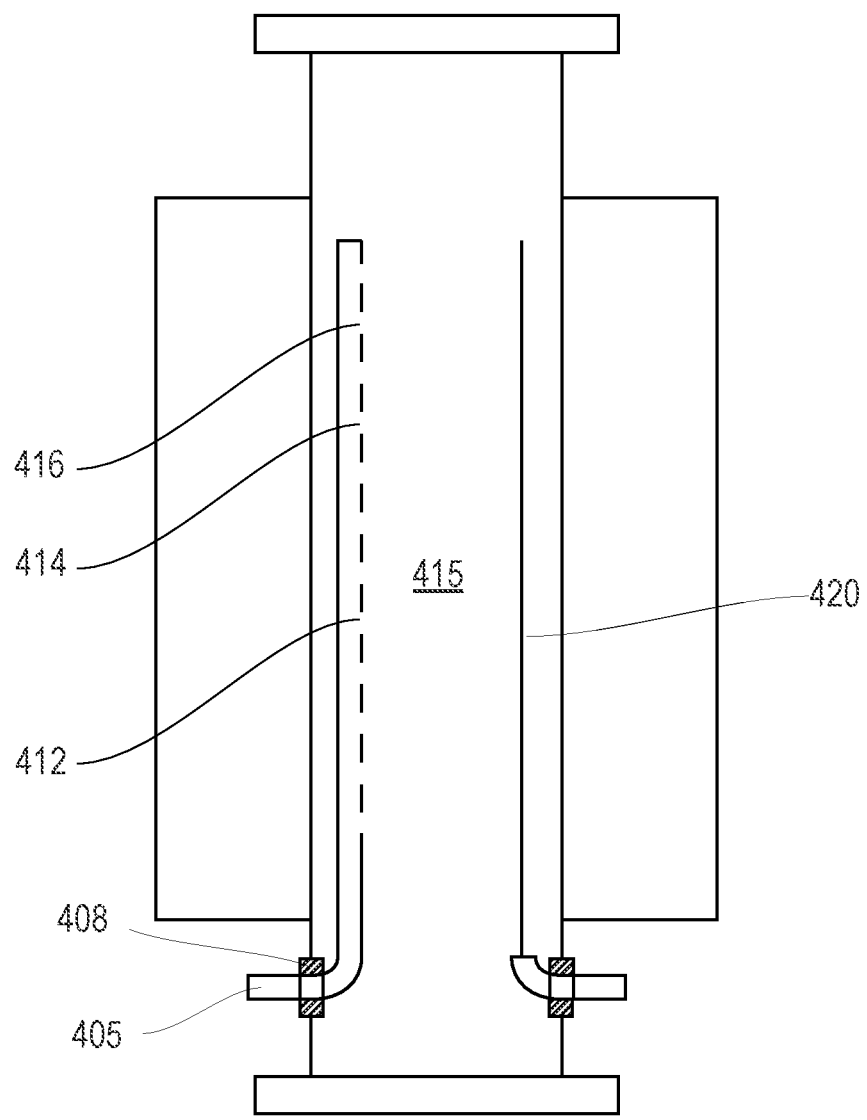
FIG. 9 is a simplified, schematic cross-sectional view of a UCP plan according to an embodiment of the present disclosure showing an exemplary Reactant Injector modified for use as a feedstock injector for fluidized bed operation
Figure 10:
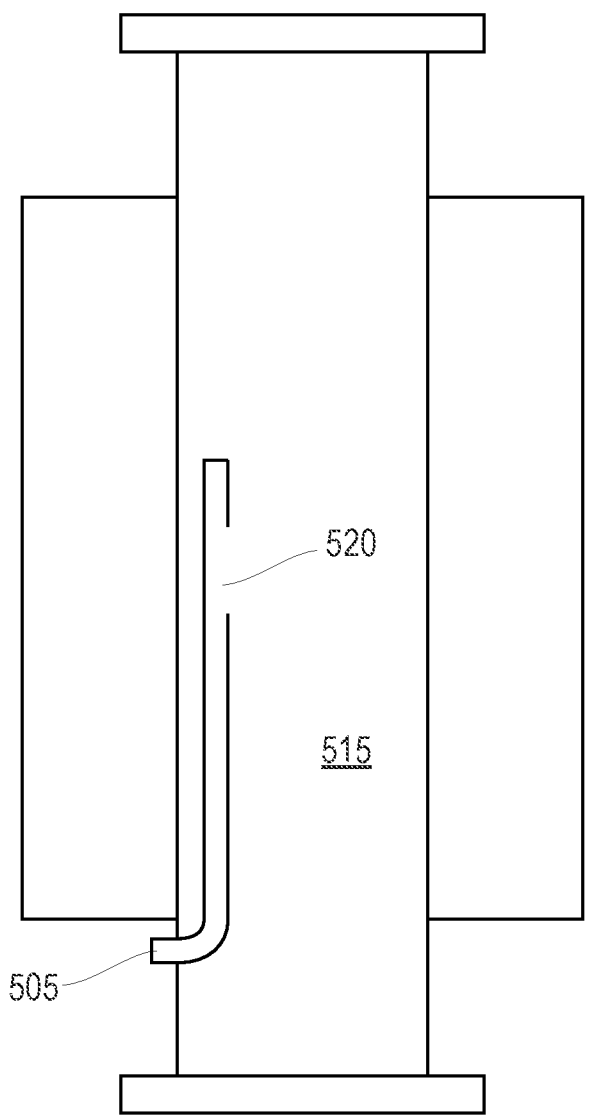
FIG. 10 is a simplified, schematic cross-sectional view of a UCP according to an embodiment of the present disclosure showing an exemplary arrangement of catalysts in the UCP.

FIG. 9 is a schematic cross-sectional view of an embodiment of a UCP showing an electrically insulated reactant inlet injector 405 that can be coupled to the housing of the UCP with an electrically insulated feedthrough 408, which can be made from ceramic material. The injector 405 is a shielded conduit that extends longitudinally into the main chamber 415 of the UCP. Reactant transported through the reactant injector exit in the reaction zone within the main chamber through the plurality of nozzles e.g., 412, 414, 416. FIG. 10 is a schematic cross-sectional view of an embodiment that includes a shielded injector 505 adapted for feedstock delivery that also extends longitudinally into the main chamber 515 of the UCP. In contrast to the embodiment shown in FIG. 2, materials transported through shielded injector 505 exit through a single large nozzle 520 into the reaction zone within the main chamber of the UCP.

Returning to FIG. 8, ports 118, 180 at the input and output ends of the UCP lead to mass spectrometers. This allows a real-time analysis of the feedstock material both before and after its being processed by the UCP. The fluidizing medium and feedstock supplied into the vessel combine and are forced through a diffuser plate 320 positioned above but proximally to the base of the vessel. The diffuser plate 320 can be made from a variety of radiation resistant materials, so long as they are appropriately porous. Alternatively, the diffuser plate can have a uniform pattern of holes to achieve the same effect. The diffuser plate 320 has the effect of distributing and increasing the uniformity of the fluidizing medium as it enters the main chamber 335 of vessel at which separations and/or other processes take place (referred to as the "separation region" when the UCP is being operated in FB mode to separate feedstock materials).

Figure 11:
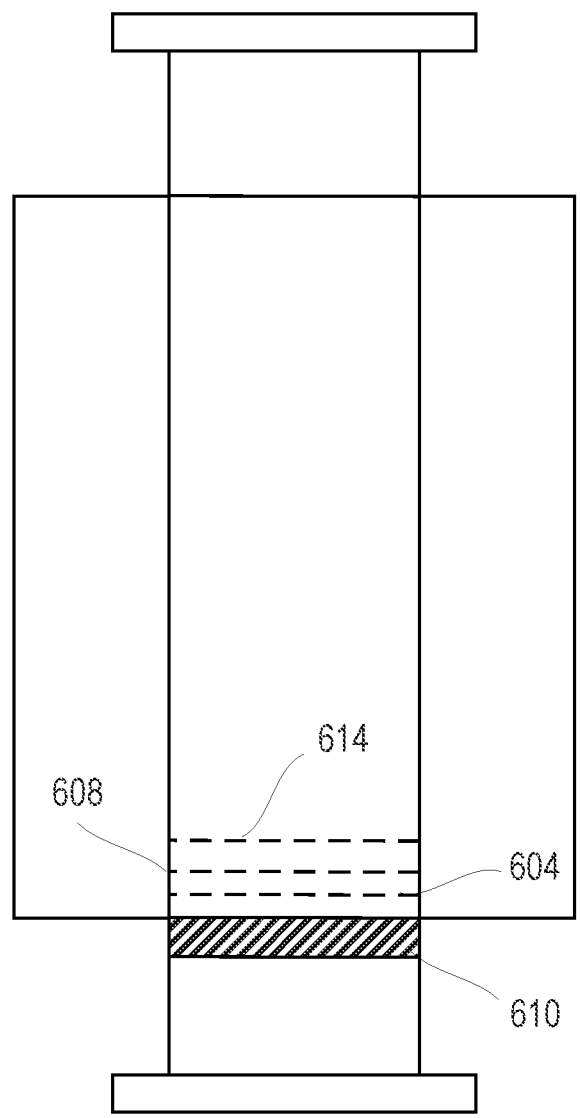
FIG. 11 is a schematic diagram showing an embodiment of a system including the UCP and a control system according to the present disclosure.

In some implementations, catalysts may be located above the diffuser plate. However, more generally, catalysts can be located in different locations within the reaction zone; different locations provide different chemical results in the output. For example, in some cases it is desirable to have the catalyst at the beginning of the reaction zone, as shown in FIG. 11, but catalysts also be positioned centrally, near the top end of the reaction zone, or outside the reaction zone entirely. The location depends on the degree of catalysis desired. While catalysts come in many forms, for clarity, their implementation as one or more screens is shown in FIG. 11. In this exemplary embodiment, two catalyst screens 604, 608 are positioned above a diffuser plate 410 and below the lower limit of the reaction zone 614 in the main chamber of the UCP (the reaction zone is explained with reference to the RXCP section the UCP below). It is noted that while two screens 604, 608 are depicted there can be a single screen or a larger number of similar screens. The screen implementation is one common method of introducing the catalyst into reactions generated in the UCP. Other forms of introducing catalysts include plates, trays, meshes and various types of porous containers and media. Introduction of other forms of catalysts will be apparent to a person of ordinary skill in this area. In some cases, catalysts may be injected through the reactant injectors. This enable catalysts to be selectively applied for steps that require catalysis.

In some embodiments, a specific category of catalysts known as electrocatalysts can be used in the beneficiation process. Electrocatalysts function at electrode surfaces or, most commonly, can be incorporated in the electrode surface itself. An electrocatalyst can be heterogeneous such as a platinized electrode. This is achieved by mounting the catalyst on an electrically insulated structure (not shown) and providing an electrically insulated electrical feedthrough to allow a voltage or signal to bias the catalyst, thus creating an electrocatalyst. Homogeneous electrocatalysts, which are soluble assist in transferring electrons between the electrode and reactants, and/or facilitate an intermediate chemical transformation described by an overall half reaction. Homogenous electrocatalysts can be employed for certain types of reactions, but are not appropriate for all reactions, as they can suffer from physical instability and solubility. Electrocatalytic action can be stimulated either by a direct electrical connection or by interaction with electric fields within the reactor vessel.

The feedstock material becomes entrained in the fluidizing medium in the main chamber 335 and the resulting combination of granular solid and fluid (including gases and plasmas) behaves as a fluid (i.e., undergoes fluidization) under certain controlled conditions. Fluidization occurs when various factors and parameters, including the dimensions of the vessel, the pressure drop across the bed, the average particle density, feedstock, and reactant flow rates, and other factors (discussed below) have magnitudes that are designed to cause the feedstock and fluid mixture to behave as a fluid. In the depicted embodiment, this is achieved by the introduction of pressurized fluidized medium through the particulate medium at the base of the vessel of an appropriate diameter. The combined granular solid/fluid medium, referred to as the fluidized bed, is a suspension, and has many of the properties of normal fluids, such as the ability to free-flow under gravity, or to be pumped using fluid-type technologies. It is this aspect of fluidized beds that allows horizontal operation. A recirculation pipe 338 receives the pressurized fluidized medium the top of the chamber, applies pressure to the fluidizing medium via a pump 161 and reapplies the fluidizing medium at the bottom of the chamber at a reentry port 163, mixing it with the incoming fluidizing medium. As noted above, additional fluidizing medium incoming from inlet port 312 can be cut off or modulated when need via isolation valve (not shown in FIG. 8). Additional fluidizing medium is typically need to offset volume loss and maintain constant pressure within the fluidized bed concentrator as product is removed.

Within the chamber 335, the upper surface of the bed is relatively horizontal but can be wave-like in nature, which is analogous to hydrostatic behavior. The bed can be considered to be a heterogeneous mixture of fluid and granular solid that can be represented by a single bulk density. Inside the fluidized bed, heavy and denser particles tend to move downwards in the bed while lighter and very small dense particles tend to move upwards, exhibiting fluid behavior in accordance with Archimedes' principle. As the density (more precisely, the solid volume fraction of the suspension) of the bed can be altered by changing the fluid fraction, objects with different densities in comparison to the average density of the bed can be caused to sink or float. The upwards force of the fluidizing medium is a strong contributor to the upward motion of the particles.

When the feedstock material is separated by density, lighter components are removed via an upper output port 340 (or a plurality of such ports) positioned at or near the top of the main chamber 335 and heavier components are removed from a lower output port 342 (or plurality of such ports) positioned toward the bottom of the main chamber above the diffuser plate 320. The height of the port and particle size and density determines the density of the material being removed. The separated material is pushed out of the fluidized bed through the output ports 340, 342 by the internal pressure within the bed. The output ports 340, 342 are connected to subsequent portions of the process which can vary widely depending on the material being processed. In addition, there is a main output port 145 positioned at the top of the reactor.

Historically, fluidized beds have been operated using granular solids, liquids, and gases. The current inventors have realized that it is possible to also operate a fluidized bed using a plasma as the fluidizing medium in the bed or having a plasma in the presence of another fluidizing medium in the bed. There are examples of other plasma processes where plasmas are flowed into a chamber at some rate to achieve a desired end result. One such example is the Plasma Wind Tunnel which is used to simulate re-entry of satellites into the atmosphere and the plasma conditions that they are subject to in that circumstance to verify that the satellite will burn up upon re-entry. A plasma, which behaves similarly to a gas, can be introduced into the chamber through the appropriate inlet port 314, while avoiding grounding out the electrical charge of the plasma by providing an insulating means to keep the plasma isolated from ground. The plasma, once inside the reactor, behaves similarly to a gas while also behaving having effects similar to those achieved in the RXCP mode. The impact of this is substantially increased reaction rates and reduced residence times in the reactor.

Figure 13:
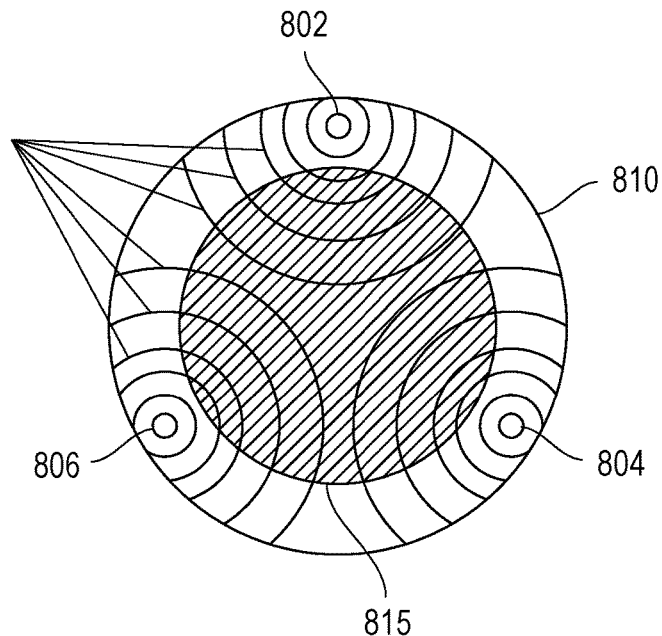
FIG. 13 is a cross-sectional view of a UCP according to an embodiment of the present disclosure in which plasma generated in the UCP are confined using electromagnetic field enhancement.

In some embodiments, the UCP includes an electrically insulated electrode within the main chamber that is adapted to either generate a plasma or an electromagnetic field within the main chamber or to maintain a plasma that has been input to the vessel. The plasma can be used to induce chemical reactions in the fluidized bed and any other effects or uses of plasma. In FIG. 9, an electrically insulated electrode 420 in the shape of a rod that extends through the reaction zone in the main chamber 415 is shown. The electrically insulated electrode is coupled to a power supply (not shown) via an insulated feedthrough 425 which can also be made from a ceramic material. The power supply may be AC, DC, or RF, depending on the particular type of plasma, electromagnetic field and biasing that is desired. The voltage of the electrode can range from as little as 2-20 Volts up to many KiloVolts depending on a number of factors including the density of the plasma, the composition and density of the feedstock and reactants in the reaction zone, and the pressure of the plasma. Essential to the successful implementation of the plasma or field enhancement is that attention be paid to the voltage ratings of the insulators, and to the shape and spacing of the electrode structures from the wall or other grounded objects such as catalysts, etc. This electrode can also be used for generation of electrostatic fields within the reactor to allow field-enhanced reactions to occur. It may be desirable to include insulated electrodes that can have a bias voltage applied to them to maintain the plasma in the Fluidized Bed when there is no X-ray present. This may be accomplished by means of a separate electrode in the reaction zone 370 or by using the outer shell of the reactant injectors as the electrode and providing an insulation means for the reactant injectors where they enter the reactor to keep them isolated and above ground potential. Different electrode configurations are shown in FIG. 13.

Figure 14:
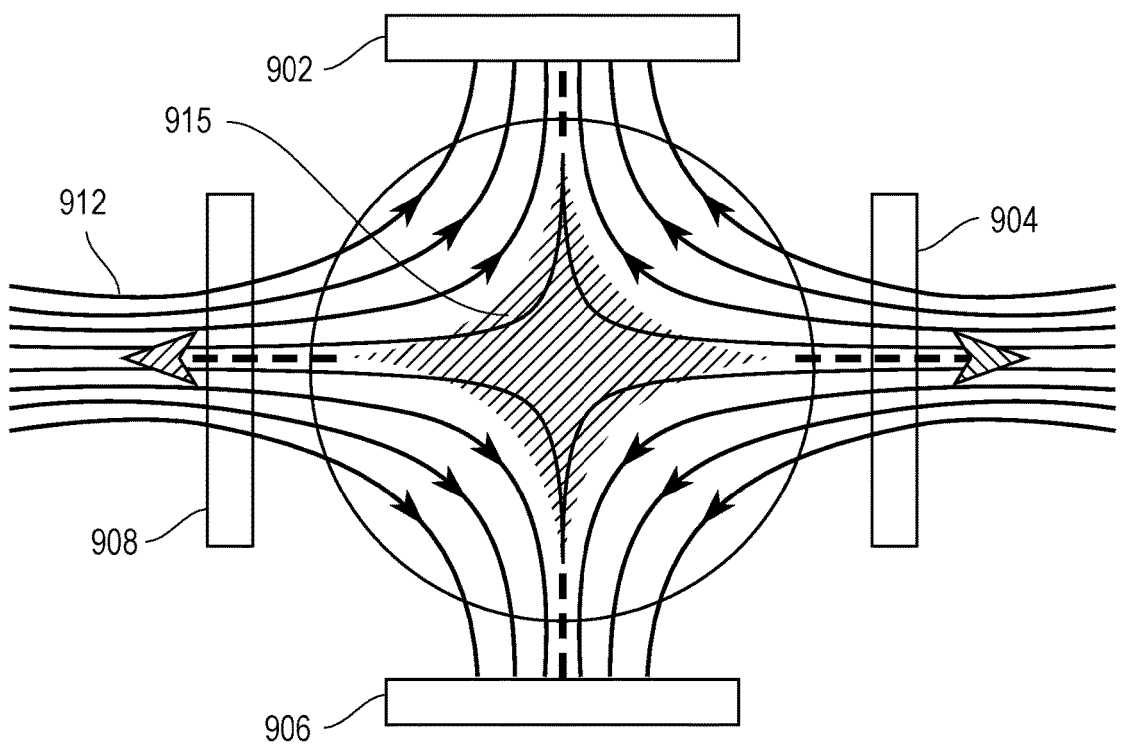
FIG. 14 is a simplified, schematic cross-sectional view of a UCP according to an embodiment of the present disclosure having an exemplary electrode configuration for plasma enhanced Fluidized Bed without X-ray.

It is desirable to keep the plasma from touching the walls of the UCP reaction zone, which is referred to as "containment". This may be accomplished by use of either electrostatic or electromagnetic means. In the preferred electrostatic embodiment, a plasma can be generated without use of X-rays by internal electrostatic fields as shown in FIG. 13 (discussed below) in which a plurality of electrodes similar to the electrode 220 shown in FIG. 9 are employed. In other embodiments, external electromagnetic coils can be used to create a magnetic field within the RXCP reaction zone area as shown in FIG. 14 (discussed below). There are many field configurations, both electrostatic and electromagnetic that will work to provide the desired isolation of the plasma from the chamber wall. These will be apparent to the person of ordinary skill in these arts. It is noted that the presence of either or both electric fields or magnetic fields in the reaction zone will generally have an impact on the chemical reactions taking place therein and is known as "Field Enhancement". The use of Field Enhancement is one of the operational modes of the UCP. As is the case with other operational modes of the UCP, this can be used in conjunction with any of the other modes.

It is noted that the UCP can be operated as a fluidized bed alone or in conjunction with the Reactive X-ray Chemical Processor (RXCP) plasma-generating processes discussed further below. The fluidized bed and plasma processes can be employed simultaneously in a UCP vessel or sequentially, either in the same unit in a batch processing environment, or in separate units in a continuous processing environment.

In FIG. 8 the middle section of the UCP includes elements of a Reactive X-ray Chemical Processor (RXCP), as discussed above with respect to FIG. 7, that can totally or partially ionize (to any desired state) chemical reactants introduced into the vessel. The following discussion repeats parts of the discussion above.

The RXCP section of the UCP uses a transmission-type X-ray source in the form of a hollow-cathode gridded electron gun. The electron gun, in turn, preferably comprises a hollow cylindrical cold field emission cathode 350 that extends longitudinally in chamber 335, a concentric cylindrical grid 355 positioned inside (hollow internal region) of the cathode and an inner concentric cylindrical anode 360 positioned concentric with the central axis of the vessel and both the cathode and grid. The electron gun, comprising the cathode 350 and grid 355 can achieve a demonstrated maximum current density of approximately 80,000 Amps/$cm^2$ in the pulse mode, which ultimately allows extremely high levels of irradiation due to the high fluence created by the large number of electrons used to create the X-ray beam. In practical applications, the cathode is not loaded to its theoretical maximum, but rather to some lesser value. For instance, for X-ray photon energies of typically 0.025-5 MeV, a high beam current that can typically range from KiloAmps to many MegaAmps can be achieved, given a sufficiently large power supply. The entire UCP apparatus is surrounded by a radiation shield 365, the thickness of which is determined by the maximum cathode voltage. Cathode voltage is supplied through an electrically insulated vacuum feedthrough 362, and grid voltage is supplied through a separate grid electrically insulated vacuum feedthrough 364. Both feedthroughs 362, 364 are electrically insulated and high vacuum sealed, and penetrate the biological radiation shield 365 and the vessel housing.

The cathode 350 is charged by a power supply (not shown) which meets the voltage, current, risetime and pulse repetition-rate requirements. The cathode can be powered continuously or in pulse mode, in which the voltage is turned on an off at a selected repetition rate. A bias resistor (also not shown) is connected between the cathode 350 and the grid 355 and is used to create a bias voltage on the grid 355 so that the tube is normally held in a standoff condition (not conducting). When a control signal of ground potential is applied to the grid 155, the grid releases control of the cathode 350 and the cathode discharges. Electrons (shown as arrows in FIG. 8) then travel from the cathode 350 to the anode 360. When they strike the anode 360, they create Bremsstrahlung X-ray radiation. A mixture of X-rays and secondary electrons are liberated from an X-ray emitting inward-facing surface of anode 360 in an isotropic fashion. The penetration depth of the incident electrons is controlled by the balance between the cathode voltage and the thickness of the anode 360. The anode 360 typically has a thin wall section in the region of the irradiation volume to achieve a degree of control over the desired transmitted irradiation. The anode wall section thickness is a function of the diameter of the interior space, the cathode voltage, and the atomic number (Z) of the anode. The secondary electrons released from the anode play an important role because they dramatically increase the number of potential reactions. In addition to totally or partially ionizing atoms with the reaction zone of the main chamber 135, each liberated secondary electron can, in turn strike atoms within the anode, causing further X-ray emission and release of additional secondary electrons. This cascade effect of the secondary electrons helps ensure that a realistic energy balance can be achieved. Therefore, the anode 360 typically has a thinner wall section in the region of the irradiation volume to achieve a degree of control over the desired transmitted Bremsstrahlung spectrum. Other radiation sources can be used instead of a cold cathode field emission X-ray source. An alternative is to use a plurality of conventional X-ray sources. It is also possible to use a nuclear radioisotope source if it has a suitable hollow cylindrical geometry, an appropriate gamma radiation output, and half-life. The entire UCP apparatus is surrounded by a radiation shield 365 whose thickness is commensurate with the X-ray (or gamma) energies generated.

Referring again to the reactant inlet port 314, in order to preserve the molecular structure of reactants that are intended to undergo ionization in the RXCP section of the UCP prior to injection, the inlet is shielded against radiation. This prevents premature dissociation, or premature partial ionization. Shielding the reactant injection system 317 also protects the reactant injector from damage that would otherwise be caused by the ionized reactants. The shielding 317 can be implanted using concentric pipes made of stainless steel or another non-reactive material. The interstitial spaces between the pipes are filled with an X-ray resistive material, typically lead or another high atomic number element. The reactant inlet port 314 leads to a shielded reactant injector 325, which is a generally cylindrical conduit having nozzles, e.g., 327. FIG. 8 also includes a plan (non-cutaway) view of another shielded reactant injector (the UCP can include one, two or more shielded reactant injectors) showing a distribution of nozzles positioned circumferentially around the injector conduit, the number of reactant injectors being dependent on the requirements of the intended reaction. Additional electrodes, either in the form of discrete electrodes or in the form of electrically insulated shielded reactant injectors can be included here for plasma support and field enhancement, or external magnetic coils can be provided for plasma confinement. It is possible to have both conditions supported. Similarly, a drier structure can be implemented here as well.

Reactants are introduced into the main chamber via shielded reactant injector(s) 325 through which they enter the reaction zone of the main chamber 335 through the shield reactant injector(s) 325. Although multiple reactant injectors can be employed, multiple reactant species can be introduced through a single reactant injector. It is noted that the injection ports can be made large to allow for substantial amounts of reactant to flow into the reaction zone 335, as would be desirable for some fluidized bed applications (See FIG. 10). The number of injection ports can be as low as desired.

When the RXCP section of the UCP is activated, and the grid is grounded, electrons are ejected to the anode, which in turn emits X-rays into the main chamber (central irradiation space 135) of the reactor toward the shield reactant injector(s). The X-rays have energies in the range of 23 KeV to 5 MeV, and are emitted from the anode either as a burst or as a continuous illumination. It is noted that X-ray energies above 5 MeV are possible but typically expected in a system of this type, and below 23 keV, they will not produce X-rays. These X-rays enter the central portion of the main chamber 335 in what is termed as a radiation zone which is spatially delimited within the vessel by a lower limit 385 and upper limit 387. Within the radiation zone, compounds and atoms preset are totally ionized into the constituent molecules into ions of the atomic species present by the mixture of X-ray photons and secondary electrons formed by the gun and other collisional interactions within the reaction zone.

Concurrently and synchronously with this, secondary, tertiary and additional reactants can be injected into the reaction space and totally ionized, either simultaneously or sequentially. There is significant intentional turbulence in the radiation zone to ensure complete mixing and interaction of any ions, electrons, atoms, and molecules. It is possible and frequently necessary to include catalysts in the radiation zone to enhance specific properties of a reaction. In most cases this will be the lowest energy state compound unless specific measures are taken to change that. The natural tendency of this system is to produce lowest energy state compounds. By adjusting the various parameters, it is possible to determine exactly what molecules will emerge once recombination is allowed (by the cessation of the X-ray flux). A number of adjustable parameters are used to control the type of reaction and the chemical reaction rates that take place. The adjustable parameters include: 1) X-ray voltage; X-ray current; X-ray pulse duration; Ratio of first and second (and subsequent, if any) reactants; Flow rates of reactants through the reactor, and Specific chemicals chosen as reactants; the use of catalysts, etc. In this regard, it is noted that high temperature of the plasma generated in the reaction chamber can be sufficient to cause various reactions by a roasting process as well.

Both feedstock materials and reactants enter the main chamber 335 and are exposed to X-rays and secondary electrons. If a fluidized bed is simultaneously present, the fluid phase of the fluidized bed is exposed to X-rays. Reactants may vary over a wide range of liquids, gases, plasma, and in some cases, granular solids as well. The amounts of each reactant and the primary feedstock are metered using mass flow controllers such as the MKS® GM50A Digital Mass Flow Controller (MFC) & Meter from MKS Instruments Inc., of Andover Mass. or other mass flow controllers used in the semiconductor industry. This class of controllers allows delivery of highly exacting amounts of materials with literally atomic levels of accuracy (i.e. the controller dispenses an exact number of atoms of the material flowing through it.). This provides very precise control of the stoichiometry of the reactions.

Due to the highly reactive nature of the plasmas contemplated by the current disclosure, it is desirable to provide a means to keep the plasmas away from the walls and injectors. There are three principle means to accomplish this: (1) electrostatically, which is the preferred embodiment (shown in FIG. 13); (2) electromagnetically (shown in FIG. 14): which is usable in some circumstances; and (3) using a physical isolation barrier (not shown). Starting with the latter, a physical isolation barrier involves placing a dielectric non-reactive insert into the reaction zone that contains the plasma to a specific region while still allowing the injection of various reactants and also illumination by both X-rays and secondary electrons.

FIG. 13 is a simplified cross-sectional view of an embodiment of a UCP that employs electrostatic plasma confinement, often referred to as field confinement or field enhancement, and is the preferred embodiment. In the embodiment shown, three equidistant electrodes 802, 804, 806 are positioned within the working zone of the main chamber insider of the inner wall 810 of the RXCP, but just outside of the reaction zone. The electrodes 802, 804, 806 are configured to produce a uniform, generally cylindrical field within which the plasma reactions will occur, referred to as a plasma confinement region 815. It is noted that other field configurations are possible. It is further noted that it is possible to utilize one or more of the reactant injectors as electrodes for the electrostatic field generation as well as a drier element if included.

FIG. 14 is a simplified cross-sectional view of an embodiment of a UCP that employs electromagnetic plasma confinement. In the embodiment shown, four electromagnet coils 902, 904, 906, 908 are positioned around a reaction zone. The activation voltage/current can be either direct (DC) or alternating (AC). When activated, the electromagnet coils 902, 904, 906, 908 generate the magnetic field illustrated by field lines 912. The magnetic field confines plasma generated within reaction zone by deflecting charged particles moving out of the confinement area (i.e., a current) back to the containment zone 915. It is noted that other coil and electromagnetic field configurations are possible. The electromagnetic field enhancement techniques can be used simultaneously with the electrostatic field enhancement techniques for plasma confinement.

Figure 15:
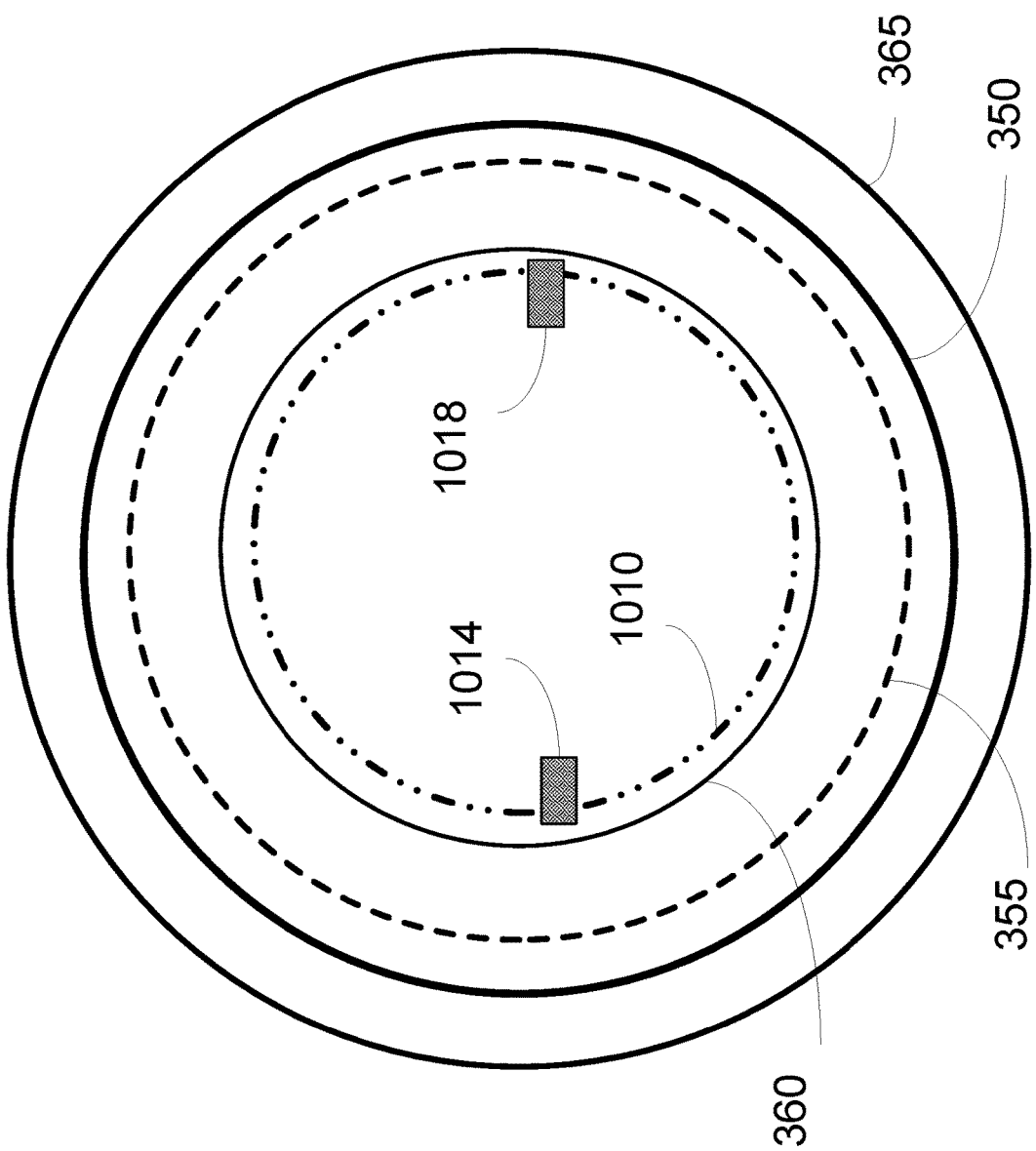
FIG. 15 is a schematic cross-sectional view of a UCP according an embodiment of the present disclosure having a heating/electrode element.

It is also desirable to be able to dry materials within the UCP. FIG. 15 is a cross-sectional view of an embodiment of a UCP having a drier element. In the axial cross-sectional view shown there are several concentric cylindrical elements, listed in turn from outermost from innermost: shielded housing 365; cathode 350, grid 355; anode 360 and drier element 1010. The drier element can comprise a generally cylindrical serpentine resistance heating element which is mounted on electrical insulators 1014, 1018 just inside the inner wall of the hollow anode 360. The drier element 1010 can also be used as an electrode for plasma initiation and maintenance by coupling the drier element to a switching means external to the inner volume of the UCP.

An online analysis of the feedstock through the mass spectrometer inlet port 318 is performed prior to processing. Following passage through the reactor, a second online chemical analysis is obtained by sampling the effluent at a second mass spectrometer inlet 180 at the upper end of the chamber to ensure that the reactants have been reacted to the desired state. It is noted that additional reactants can be added in the correct ratios in order to achieve a desired reactions and concentrations. Mass flowmeters (not shown in FIG. 8) provide an instrumented dispensing and feedback system for controlling the exact amounts of reactants supplied to the system. By controlling these factors, along with the X-ray voltage and current, it is possible to tune the system to produce a wide range of chemical outputs. As described below and illustrated in FIG. 13, a host computer equipped with suitable processing, memory and communication resources is coupled to the supply inlets, mass flowmeters and mass spectrometer and combines all information sources and utilizes artificial intelligence-based operations to ensure that reactor parameters are always optimized for the desired output product. The operation of the mass flow controllers is controlled by the host computer with inputs from residual gas analyzers and other analytic instruments attached to the system that monitoring the input and output of the system.

As reactions occur in the main chamber 335, certain compounds precipitate out and are removed from the output of the system through the appropriate output port. After one or more iterations of this process, the effluent becomes free of unwanted chemical components and any biological or organic components. For example, when the UCP is used for treatment of water, it decomposes any pharmaceutical or other complex organic compounds such as pesticides that are present. It is noted that all ports have valves on them (not shown) so that they can be opened, closed, or moderate the flow as process conditions require.

The RXCP section of the UCP can be operated as a Flash X-ray irradiator (FXI). In FXI mode, high-intensity x-radiation is applied to the reaction zone typically with reactant feeds switched off. In this mode, feedstock is generally input through the feedstock input port with the remaining ports switched off. However, in some circumstances, the other inlet ports can be used to supply materials in the FXI mode as discussed above.

To combine the fluidized bed and RXCP, certain modifications are made to take advantage of the fact that the RXCP typically incorporates a cylindrical process section. One important modification is to add a perforated bottom plate with a feed connection for the fluidizing means, and inlet and outlet ports in the sides of the reaction area if the UCP is mounted vertically, or a perforated bottom plate if horizontal. Depending on the specification composition of the material to be separated, it may be desirable to incorporate a screening step either before or after the fluidized bed step, and external to the UCP, to increase the efficiency of separation. It is noted that the location of the inlet and outlet ports is dependent on whether the UCP is to be used in a batch or continuous mode, and whether it is to be used horizontally or vertically. When the UCP is operated as a fluidized bed in the horizontal position, it is necessary to relocate the diffuser and catalysts to accommodate this orientation, as the diffuser needs to be at the bottom of the fluidized bed in order for the bed to operate. The FXI functionality is achieved by turning off the reactant injection means and just operating the X-ray generating section of the UCP (i.e., the cathode, grid and anode). For the purposes of this application the batch processing vertical mode is a preferred embodiment but horizontal operation in the continuous mode is practical and most likely to be employed in industrial scale processes.

Regardless of which mode the UCP it is used in, there are certain commonalities that are identified including the ability to operate in multiple sequential modes, including but not limited to: i) Fluidized Bed (FB) only; ii) RXCP only; iii) Flash X-ray only, full UC, which includes either iv) FB+RXCP; v) FB+RXCP+FXI; vi) FB+drying; vii) FB+RXCP+drying; viii) FB+RXCP+Field Enhancement; ix) RXCP+drying and x) RXCP+Field Enhancement. All of the above operating modes can be performed in either continuous or batch mode. All of the above modes can be performed with electromagnetic field enhancement, electrostatic field enhancement both enhancement techniques, and any of the above can be performed in plasma or non-plasma environments as required. It is again noted that the UCP mode includes the FXI capability by just switching off the reactants. Other FXI operations will also occur during this mode. The various combinations of process attainable will be apparent to a person of ordinary skill in the art.

The UCP can perform Fluidized Bed reaction operations in the presence of high intensity x-radiation, thus allowing total ionization of the reactants during the fluidizing operation and enabling the sophisticated plasma reactions generated by the RXCP to occur during fluidization. Fluidizing dramatically increases the contacting of the reactants, thus offering improved performance over just RXCP class operations alone. As a direct result of the number of possible separation chemical reactions and other processes provided by the UCP, it is possible to simplify many industrial processes, including mining and mineralogical operations, thus reducing both capital and operating costs while simultaneously eliminating much, if not all, pollutants from these operations and increasing yield. It is noted that the electrostatic field confinement/enhancement will also provide improvement in system operability and reliability. Due to the plurality of operating modes, the device is referred to as a "universal" chemical reactor.

Catalysts can be introduced into the UCP via the reactant feed to accelerate chemical reactions, or they can be permanently mounted in the reaction zone. Catalysts are not consumed in the catalyzed reaction hence they are unchanged after the reaction. In many types of reactions, often only very small amounts of catalyst are required. Furthermore, some reactions can only occur in the presence of a catalyst. Operations of the fluidized bed and RXCP (and FXI) can both be enhanced by the use of catalysts in certain situations. In general, chemical reactions occur faster in the presence of a catalyst because the catalyst provides an alternative reaction pathway or mechanism with a lower activation energy than the non-catalyzed mechanism. In catalyzed mechanisms, the catalyst usually reacts to form an intermediate, which then regenerates the original catalyst in the process. Many materials can function as catalysts, ranging from inorganic compounds such as Titania (Titanium Dioxide ($TiO_2$)) or Manganese Dioxide($MnO_2$) to complex organic compounds such as Wilkinson's catalyst, (chloridotris(triphenylphosphine)rhodium), $RhCl(PPh_3)_3$. As an illustrative example, Wilkinson's catalyst loses one triphenylphosphine ligand before entering the true catalytic cycle. In general, ligands are viewed as electron donors and the metals as electron acceptors, (i.e., respectively, Lewis bases and Lewis acids. In the Lewis theory of acid-base reactions, bases donate pairs of electrons and acids accept pairs of electrons. A Lewis acid is therefore any substance, such as the H+ ion, that can accept a pair of nonbonding electrons. Lewis base is any substance, such as the OH− ion, that can donate a pair of nonbonding electrons. A Lewis base is therefore an electron-pair donor). In plasma chemistry, the use of ligands may be obviated due to the surplus electrons that can be generated. This does not apply to all reactions but can be a major cost saving factor in some.

In the case of the Fluidized bed portion of the UCP, the use of catalysts has been studied, and numerous reactive processes conducted in Fluidized Beds are enabled by the presence of a catalyst. In the case of the RXCP section of the UCP, the introduction of a catalyst can be a pivotal addition in enabling a reaction. The operating principle of the RXCP (and the FXI) is that following the total ionization step in these processes, the ions present will seek to immediately recombine into their lowest energy state as described above. By the introduction of a catalyst, this process can be altered to favor the formation of one compound over another.

To achieve improved process results for some uses of the UCP, it is frequently useful to perform pre-reaction filtration of the feedstock and reactant materials to remove as much particulate reactant matter as possible to minimize the amounts of material the reactor has to process, and post-filtration to remove precipitated material. This can be done by any of a number of well-known processes including, but not limited to, fluidized bed separation according to the present disclosure, screening, hydrocyclonic separation, basket type filters, or any of several others. The hydrocyclonic method is appropriate as it is a continuous high-volume method of separation, there are a number of suppliers of hardware, the hydrocyclonic separator requires less maintenance than basket type filters. A significant shortcoming of hydrocyclonic separation is that it is not as effective at removing fine and microscopic contaminants as basket type filters or other processes. We note that removal of as much material before the RXCP section of the UCP process reduces the amount of energy required to run the process.

Similarly, as the RXCP section of the UCP is designed to produce precipitates of several compounds in its output stream, these can be separated to render them usable for other purposes. Multi-stage basket filters of progressively finer pore sizes are a good way to achieve the desired state of cleanliness, although many other means including centrifugal and cyclonic are possible.

Figure 12:
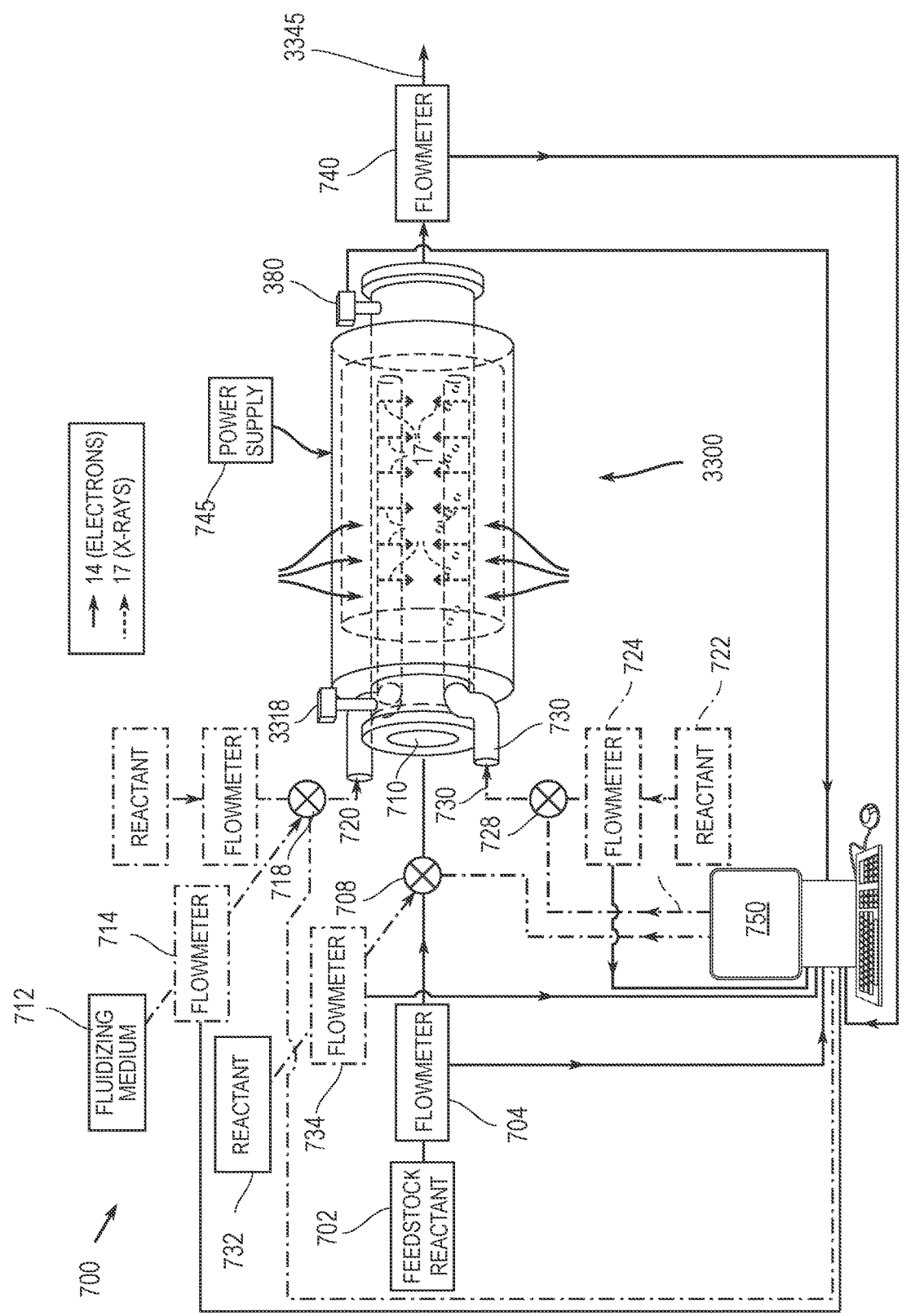
FIG. 12 is a cross-sectional view of a UCP according to an embodiment of the present disclosure in which plasma generated in the UCP are confined using electrostatic field enhancement.

FIG. 12 is a schematic diagram showing an embodiment of a system including the UCP and a control system according to the present disclosure. In the system 700, a number of controlled inputs are fed to the UCP, and both inputs and outputs are monitored and under the control of a host computer 750. A feedstock supply 702, such as a tank or other container, delivers feedstock material through a supply line that is monitored by a feedstock flowmeter 704 which measures a mass flow rate of the input feedstock material through the feedstock supply line. Output from the feedstock flowmeter is delivered to the host computer 750 (through a wired or wireless connection). A feedstock supply control valve 708 is positioned on the feedstock supply line between the flowmeter 904 and the feedstock input port 710 of UCP 300. The feedstock control valve is also communicatively coupled to the host computer to receive control signals to open or close the valve depending on the operation of the UCP as determined by algorithms executed by the host computer 750.

The host computer 750 is configured using software instructions or suitable firmware to compare the mass spectrometer data generated from feedstock input and output, among other data sources, and compare the output data to a reference spectrum of a desired end product. Based on this analysis, the host computer determines whether to increase, decrease, or maintain the same flow rate of reactants. Once these adjustments are made, the host computer iterates additional analyses to determine if the adjustments made bring the end product closer to or further away from the desired end result product. Further adjustments can be made based on these iterations. The host computer continues the iterations until the output has stabilized within set lower and upper bounds. If the resulting output product is determined to be too far out of specification for the host computer to correct, then it shuts the chemical processes down and issues a notification to an operator. The host computer also monitors other critical functions for safety purposes and will shut down the system if any of the monitored parameters are out of specified range and thus presenting a safety hazard.

Similarly, a fluidizing medium supply 712 delivers fluidizing medium through a supply line that is monitored by a fluidizing medium flowmeter 714 which measures a mass flow rate of the fluidizing medium through the fluidizing medium supply line. The fluidizing medium supply can comprise a pressurized liquid and/or gas tank. A fluidizing medium control valve 718 is positioned between the fluidizing medium flowmeter 914 and fluidizing medium input port 720 of the UCP 300. Both the fluidizing medium flowmeter 714 and the fluidizing medium control valve 718 are communicatively coupled to the host computer 750, the fluidizing medium flowmeter 714 providing measurement signals to the host computer 750 and the fluidizing medium control valve 918 receiving command signal from the host computer to regulate the fluidizing medium supply depending upon operating conditions of the UCP. Likewise, a reactant supply 722, which can also comprise a tank or other container, delivers reactant material through a supply line that is monitored by a reactant flowmeter 724 which measures a mass flow rate of the input reactant material. A reactant supply control valve 728 is positioned between the reactant flowmeter 724 and reactant input port 730 of the UCP 300. Both the reactant flowmeter 724 and the reactant supply control valve 728 are communicatively coupled to the host computer 950, the reactant flowmeter 724 providing signals indicative of the reactant mass flow rate to the host computer 750 and the reactant supply control valve 928 receiving command signal from the host computer to regulate the reactant supply depending upon operating conditions of the UCP. In some implementations, an additional reactant supply 732 delivers further reactants (which can be different from the reactants from reactant supply 722) into a secondary reactant supply line that leads into the feedstock supply line via the feedstock control valve 704. The feedstock and secondary reactant are thus supplied into the UCP 300 through the feedstock input line 710. A secondary reactant flowmeter 734 measures the mass flow rate through the secondary reactant supply line and delivers measurement signals to the host computer 750. The feedstock, fluidizing medium and reactant supplies 702, 712, 722, 732 can comprise pipes rather tanks in continuous mode.

The pairs of flowmeters and control valves, 704/708, 714/718 and 724/728 can be but need not necessarily implemented in distinct devices. In some embodiments, both metering and fluid regulation functions can be performed by a single device using semiconductor technology as known in the art.

Figure 16:
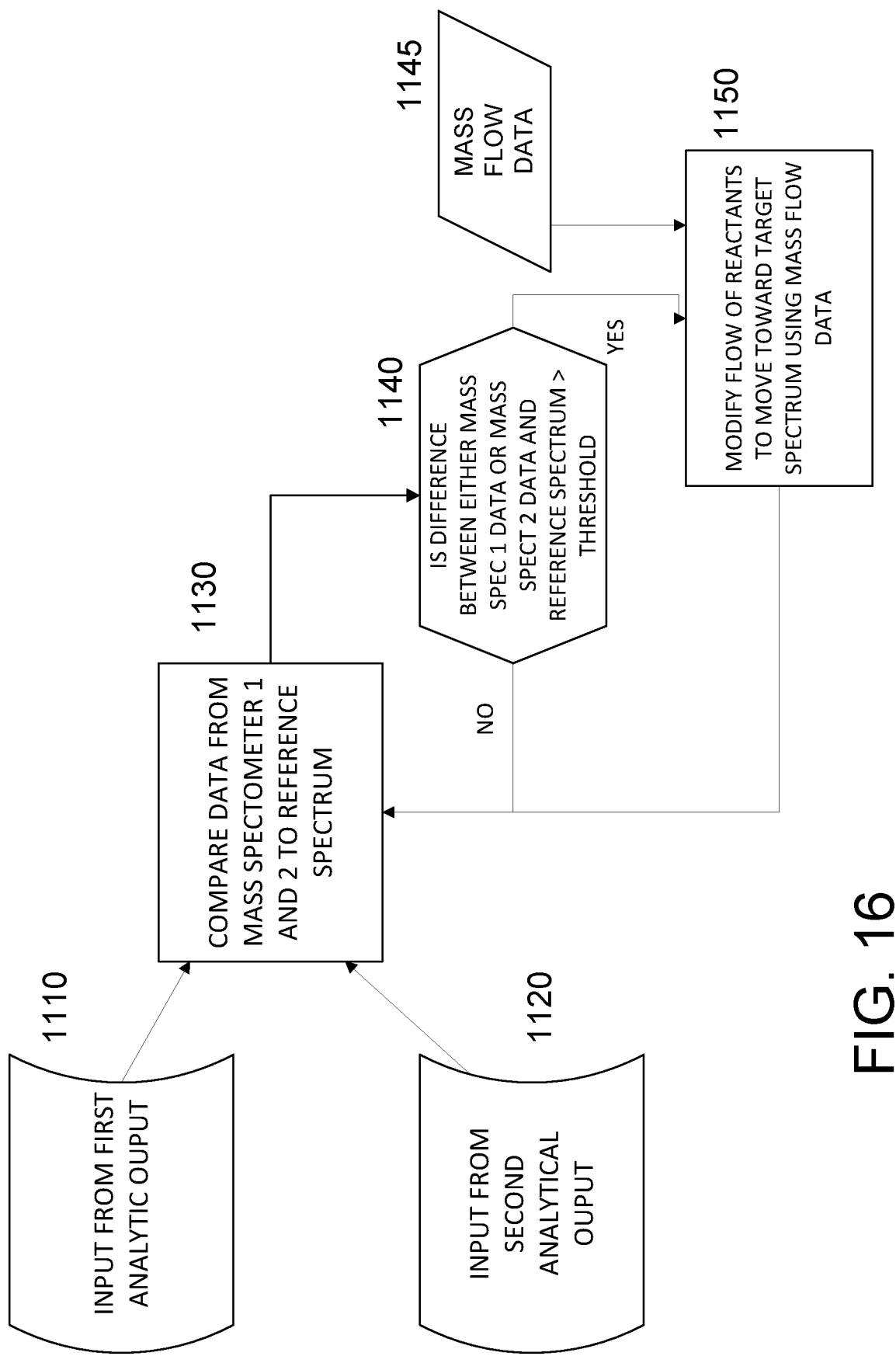
FIG. 16 is a flowchart of an exemplary method for controlling a beneficiation process using a host computer according to the present disclosure.

FIG. 16 is a flow chart of a method of controlling a beneficiation process using a host computer according to the present disclosure. In initial steps 1110 and 1120, the host computer receives data processed from first and second analytical outputs, obtained from the input and output ends of the reactor. The data from the analytical outputs can be processed using one or more mass spectrometers, for example. In step 1130, the host computer compares the data from the analytical outputs (e.g., mass spectrometer data) to a reference (target) spectrum. To be clear, the reference spectrum may be different for the first and second analytic outputs as the desired input feedstock and reactants will tend to be different from the desired outputs. In either case, in step 1140, the host computer determines whether the difference between the analytic output data and the reference spectrum is greater than a selected threshold. If it is determined that the difference not is greater than the threshold ("No"), the method cycles back to steps 1110 and 1120 and new data is received. If, in step 1140, it is determined that the difference between the analytic output data is greater than the threshold ("Yes") then in step 1150, the host computer modifies the rates at which feedstock, reactants are provided to the reactor subject to mass flow data received from the various mass flow detectors received (previously to modification) by the host computer in step 1145.

The UCP 300 includes a first analytic output 318 that feeds a sample of input materials feed into the proximal end of the UCP 300 to a first mass spectrometer (not shown in FIG. 2). The output from the first mass spectrometer is fed to the host computer 750. At the other distal end of the UCP there is a second analytic output 380 that feeds a sample of output products to a second mass spectrometer (also not shown). The output from the second mass spectrometer is also fed to the host computer 750. The distal end of the UCP also includes a main output port 345 for the products of reactions and other processes that occur within the UCP. An output flowmeter 740 measures a flow rate of the output products and delivers measurement signals to the host computer 750. The material that exits through the main output port 345, which can be the desired product of reactions that are induced by RXCP or FXI operation, can lead to a tank, pipe, or additional process components. When used in batch mode, a single reactor can be used and the various process steps are implemented sequentially by changing various feeds and electrical parameters. When operated in continuous mode, fewer simultaneous operations are used and multiple UCP can be coupled sequentially or otherwise to implement a specific process.

The host computer 750 is also communicatively coupled to a recirculation pump (not shown in FIG. 12 for case of illustration) so as to regulate pressure within the UCP. The host computer 750 is configured to assess the flow rate information received from the flow meters as well as the information received from the mass spectrometers as to the composition of the input reactants (all reactants including the feedstock) and the output products, to regulate the flow of materials into the UCP via the control valves 704, 714, 724. For example, the host computer can determine that reactions are proceeding too quickly and execute commands to restrict the flow of input materials to slow down the reaction rate.

An electrical power supply 745 provides power to the cathode and grid of the UCP 300. The host computer 950 also provides control signals to operate the various components of the RXCP section of the UCP 300 and receives electrical signals for monitoring the state of the UCP. For example, the host computer 950 controls operation of the grid 355 of the RXCP to cause switch the electron gun on or off.

When the UCP is used for separation of feedstock materials, typically but not necessarily in fluidized bed operation, relatively heavier components exit from the lower output port 340 and lighter components exit from the upper output 342 (shown in FIG. 8). Flowmeters can also be positioned at the lower and upper separation output ports 340, 342 to provide mass flow rate data for the separated flows to the host computer 750 (the separation output port flowmeters are not shown for ease of illustration).

The UCP described herein provides a number of synergies and advantages over the standalone components and other types of chemical processors. The increased mixing and contacting of reactants, catalysts, and feedstock due to the presence of the enhanced fluidized bed results in higher throughput and more complete reactions per stage than conventional individual reactors and processors. This is due to the fact that the UCP has increased versatility in that a single system is able to implement multiple processes. Additionally, the processes can be changed (e.g., changing operation from fluidized bed mode alone to fluidized by RXCP mode) without extensive changeover work. Put another way, the ability to support multiple operating modes in a single device means a single factory can produce multiple products or change process parameters and configurations more readily than with individual stages.

The UCP also has a more compact design and smaller footprint than equivalent processing systems of similar capabilities. The compact design enables a simpler electrical system with better coordination. The aforementioned advantages lead to lower manufacturing costs due to a more universal design requiring fewer variations, and greater economics of scale can be achieved. The UCP concept as presented herein represents an unanticipated means of achieving process flexibility heretofore unavailable in traditional chemical processing plants.

With respect to beneficiation, the fluidized bed concentrator, the RXCP and UCP discussed herein fulfill a long-sought need. The types of operations these devices, taken alone, but more particularly in combination, can perform eliminate the need for toxic and contamination wet chemical processes that have been in use for hundreds of years. The impact on both the environment and civilian populations located proximate to these mining operations is immediate and enormous. Due to the combination of effective materials separation using the fluidized bed, elimination of environmental toxins, and abatement using the capabilities of the plasma-based processes of the RXCP and UCP to modify or decompose dangerous byproducts, mining beneficiation need no longer be an activity that is environmentally hazardous due to the creation of large quantities of toxic liquid waste and can be performed cost-effectively in locations and jurisdictions which would previously have been infeasible.

It is noted that other mining industries can benefit from the technology of the current invention. As an example, the oil and gas production industries produce vast quantities of waste byproducts that are radioactive and as such, present a serious environmental problem. Essentially the same process described herein for the removal of radioactive materials from phosphogypsum waste (see Example 2 below) can be utilized advantageously by the oil and gas industry for essentially the same requirement (i.e. removal of radioactive material from a process stream (see Example 3 below), as is the case with phosphogypsum, Radium and Radon are two of the major radioactive components that must be remediated.

It is to be understood that any structural and functional details disclosed herein are not to be interpreted as limiting the systems and methods, but rather are provided as a representative embodiment or arrangement for teaching one skilled in the art one or more ways to implement the methods.

It is to be further understood that like numerals in the drawings represent like elements through the several figures, and that not all components or steps described and illustrated with reference to the figures are required for all embodiments or arrangements.

The terminology used herein is for the purpose of describing particular embodiments only and is not intended to be limiting. As used herein, the singular forms "a", "an" and "the" arc intended to include the plural forms as well, unless the context clearly indicates otherwise. It will be further understood that the either of the terms "comprises" or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for beneficiation of mineralogical materials comprising:
   performing at least one chemical reaction on the mineralogical materials using a process that uses a plasma generated by ionizing radiation and secondary electrons for inducing the at least one chemical reaction, the at least one chemical reaction serving to sever chemical bonds between components of the mineralogical materials to enable separation of targeted metallic elements contained in the mineralogical materials; and
   performing at least one separation on the mineralogical materials to retrieve the targeted metallic elements,
   wherein the mineralogical materials contain at least one material selected from the group of a Lanthanide and an Actinide.

2. The method of claim 1, wherein the mineralogical materials include at least one of: a i) Lanthanide ore, ii) tailings containing at least one material selected from the group of a Lanthanide and an Actinide, iii) a byproduct of a mining operation containing at least one material selected from the group of a Lanthanide and an Actinide, and iv) a waste stream of a mining process containing at least one material selected from the group of a Lanthanide and an Actinide.

3. A method for beneficiation of mineralogical materials comprising:

performing at least one chemical reaction on the mineralogical materials using process that uses a plasma generated by ionizing radiation and secondary electrons for inducing the at least one chemical reaction, the at least one chemical reaction serving to sever chemical bonds between components of the mineralogical materials to enable separation of targeted metallic elements contained in the mineralogical materials; and performing at least one separation on the mineralogical materials to retrieve the targeted metallic elements, wherein the mineralogical materials are input as feedstock into a fluidized bed concentrator in which a fluidized bed process occurs.

4. The method of claim 3, wherein the fluidized bed concentrator separates components of the mineralogical materials according to density.

5. The method of claim 1, wherein the plasma-based process is performed using a Reactive X-ray Chemical Processor (RXCP).

6. The method of claim 3, wherein both the fluidized bed process and plasma-based process are performed within a Universal Chemical Processor apparatus (UCP).

7. The method of claim 3, further comprising drying one of i) materials separated by the fluidized bed process or ii) producing of the chemical reaction on the mineralogical materials using the plasma-based process.

8. The method of claim 3, further comprising applying at least one of an electric field and a magnetic during one of the fluidized bed process or the plasma-based process to enhance a chemical reaction.

9. The method of claim 1, wherein the separation removes radioactive material from the mineralogical materials.

10. The method of claim 1, wherein the separation removes Lanthanide elements from the mineralogical materials.

11. A method process for beneficiation of mineralogical materials comprising:

injecting reactants including mineralogical materials into a reaction chamber via conduit shielded from ionizing radiation and secondary electrons;

performing at least one separation on the mineralogical materials using a fluidized bed process in the reaction chamber; and performing at least one chemical reaction on the mineralogical materials using process in which a plasma generated by ionizing radiation and secondary electrons induces the at least one chemical reaction.

12. The method of claim 1 further comprising injecting reactants including mineralogical materials into a reaction chamber via conduit shielded from ionizing radiation and secondary electrons.

13. A method process for beneficiation of mineralogical materials comprising:

performing at least one chemical reaction on the mineralogical materials using a plasma-based process that generates ionizing radiation and secondary electrons for inducing the at least one chemical reaction; and performing at least one separation on of the mineralogical materials, wherein the mineralogical materials contain at least one material selected from the group of a Lanthanide and an Actinide.

14. A method process for beneficiation of mineralogical materials comprising:

generating a plasma in a reaction chamber using X-rays;

introducing mineralogical materials into the reaction chamber;

inducing ionization and thereby chemical reactions in the mineralogical materials exposed to the plasma within the reaction chamber, wherein the chemical reactions enable separation of targeted metallic elements contained in the mineralogical materials; and performing at least one separation on the mineralogical materials to retrieve the targeted metallic elements.

15. The method of claim 14, wherein the reactants include hydrogen sulfide gas and oxygen to avoid wet leaching with sulfuric acid.

16. The method of claim 14, wherein the feedstock includes phosphogypsum material.

17. The method of claim 16, wherein the reactants include ammonia to avoid wet leaching with manganese oxide.

18. The method of claim 14, wherein the reactants include fluorapatite and water to produce phosphoric acid and hydrofluoric acid after ionization.

19. The method of claim 14, wherein the high X-rays have photon energies in a range of 0.025 to 5 MeV.

20. The method of claim 14, further comprising positioning catalysts in the reaction zone to affect the chemical reactions.

21. The method of claim 20, further comprising mounting the catalyst on an insulated surface and introducing a voltage to bias the catalyst, creating an electrocatalyst.

22. The method of claim 14, further comprising containing the plasma generated in the reaction chamber.

23. The method of claim 22, wherein the plasma is contained electrostatically.

24. The method of claim 22, wherein the plasma is contained electromagnetically.

25. The method of claim 22, wherein the plasma is contained using a physical isolation barrier.

* * * * *